United States Patent
Sun et al.

(10) Patent No.: US 12,218,874 B2
(45) Date of Patent: Feb. 4, 2025

(54) CONFIGURING AND USING DEVICE-TO-DEVICE DEMODULATION REFERENCE SIGNAL (DMRS)

(71) Applicant: Apple Inc., Cupertino, CA (US)

(72) Inventors: Haitong Sun, Cupertino, CA (US); Chunxuan Ye, Cupertino, CA (US); Dawei Zhang, Cupertino, CA (US); Haijing Hu, Cupertino, CA (US); Wei Zeng, Cupertino, CA (US); Yushu Zhang, Beijing (CN); Zhibin Wu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,048

(22) PCT Filed: Jun. 25, 2021

(86) PCT No.: PCT/CN2021/102436
§ 371 (c)(1),
(2) Date: Sep. 22, 2021

(87) PCT Pub. No.: WO2022/267023
PCT Pub. Date: Dec. 29, 2022

(65) Prior Publication Data
US 2024/0031095 A1    Jan. 25, 2024

(51) Int. Cl.
*H04L 5/00* (2006.01)
*H04L 25/02* (2006.01)

(52) U.S. Cl.
CPC ........ *H04L 5/0051* (2013.01); *H04L 25/0224* (2013.01)

(58) Field of Classification Search
CPC . H04L 5/0051; H04L 25/0224; H04L 5/0016; H04L 5/0092; H04L 5/0091
See application file for complete search history.

(56) References Cited

U.S. PATENT DOCUMENTS

| | | |
|---|---|---|
| 2019/0028252 A1 | 1/2019 | Akkarakaran et al. |
| 2020/0336355 A1 | 10/2020 | Yamada et al. |
| 2021/0029707 A1* | 1/2021 | Xu .......... H04L 5/0048 |
| 2022/0407645 A1* | 12/2022 | Wang .......... H04L 5/0048 |
| 2023/0421327 A1* | 12/2023 | Ly ............ H04W 72/1268 |

FOREIGN PATENT DOCUMENTS

| | | |
|---|---|---|
| CN | 110855410 A | 2/2020 |
| CN | 111435875 A | 7/2020 |
| KR | 20190056515 A | 5/2019 |
| WO | 2020143829 A1 | 7/2020 |

OTHER PUBLICATIONS

International Patent Application No. PCT/CN2021/102436, International Search Report and Written Opinion, Mailed on Mar. 16, 2022, 9 pages.
3rd Generation Partnership Project; Technical Specification Group Radio Access Network; NR; Physical channels and modulation (Release 16), 3GPP TS 38.211 V16.5.0, Mar. 2021, 134 pages.

* cited by examiner

*Primary Examiner* — Ashley Shivers
(74) *Attorney, Agent, or Firm* — Kilpatrick Townsend & Stockton LLP

(57) ABSTRACT

The present application relates to devices and components including apparatus, systems, and methods to configure and used demodulation reference signals for device-to-device communications in, for example, new radio.

20 Claims, 18 Drawing Sheets

```
┌─────────────────────────────────────────────────────────────────┐
│ Generating, for a receiver device, a configuration of demodulation reference │
│ signals (DMRSs) for a physical sidelink shared channel (PSSCH), the │
│ configuration indicating a code division multiplexing (CDM) group │
│ associated with a plurality of antenna ports, the plurality of antenna ports │
│ including more than two antenna ports 702 │
└─────────────────────────────────────────────────────────────────┘
                                  │
                                  ▼
┌─────────────────────────────────────────────────────────────────┐
│ Sending, to the receiver device, the configuration 704 │
└─────────────────────────────────────────────────────────────────┘
                                  │
                                  ▼
┌─────────────────────────────────────────────────────────────────┐
│ Sending, to the receiver device, the DMRSs based on the configuration 706 │
└─────────────────────────────────────────────────────────────────┘
```

Determining a configuration of demodulation reference signals (DMRSs) for a physical sidelink shared channel (PSSCH), the configuration indicating a code division multiplexing (CDM) group associated with a plurality of antenna ports, the plurality of antenna ports including more than two antenna ports 802

Receiving, by using the plurality of antenna ports, the DMRSs on the PSSCH based on the configuration, the DMRSs received in resource elements (REs) corresponding to the CDM group 804

Performing, based on the DMRSs, a channel estimation for demodulation of the PSSCH 806

```
┌─────────────────────────────────────────────────────────────────┐
│ Determining a configuration of demodulation reference signals   │
│ (DMRSs) for a physical sidelink shared channel (PSSCH), the     │
│ configuration indicating a plurality of DMRS positions in a     │
│ slot, the plurality of DMRS positions including more than four  │
│ positions 1202                                                  │
└─────────────────────────────────────────────────────────────────┘
```

```
┌─────────────────────────────────────────────────────────────────┐
│ Receiving the DMRSs on the PSSCH based on the configuration,    │
│ the DMRSs received at the plurality of DMRS positions 1204      │
└─────────────────────────────────────────────────────────────────┘
```

```
┌─────────────────────────────────────────────────────────────────┐
│ Performing, based on the DMRSs, a channel estimation for        │
│ demodulation of the PSSCH 1206                                  │
└─────────────────────────────────────────────────────────────────┘
```

Generating, for a receiver device, a configuration of demodulation reference signals (DMRSs) for a physical sidelink shared channel (PSSCH), the configuration indicating that a first DMRS received in a first slot can be bundled with a second DMRS received in a second slot for a channel estimation for demodulation of the PSSCH 1402

Sending, to the receiver device, the configuration 1404

Sending, to the receiver device, the DMRSs based on the configuration 1406

```
┌─────────────────────────────────────────────────────────────┐
│ Determining a configuration of demodulation reference signals (DMRSs) for │
│ a physical sidelink shared channel (PSSCH), the configuration indicating │
│ that a first DMRS received in a first slot can be bundled with a second │
│ DMRS received in a second slot for a channel estimation for demodulation │
│                    of the PSSCH 1502                        │
└─────────────────────────────────────────────────────────────┘
                              │
                              ▼
┌─────────────────────────────────────────────────────────────┐
│ Receiving the DMRSs on the PSSCH based on the configuration, the first │
│ DMRS received in the first slot and the second DMRS received in the │
│                    second slot 1504                         │
└─────────────────────────────────────────────────────────────┘
                              │
                              ▼
┌─────────────────────────────────────────────────────────────┐
│ Determining a DMRS measurement based on a first measurement on the │
│  first DMRS and a second measurement on the second DMRS 1506 │
└─────────────────────────────────────────────────────────────┘
                              │
                              ▼
┌─────────────────────────────────────────────────────────────┐
│ Performing, based on the DMRS measurement, the channel estimation │
│                         1508                                │
└─────────────────────────────────────────────────────────────┘
```

Figure 15

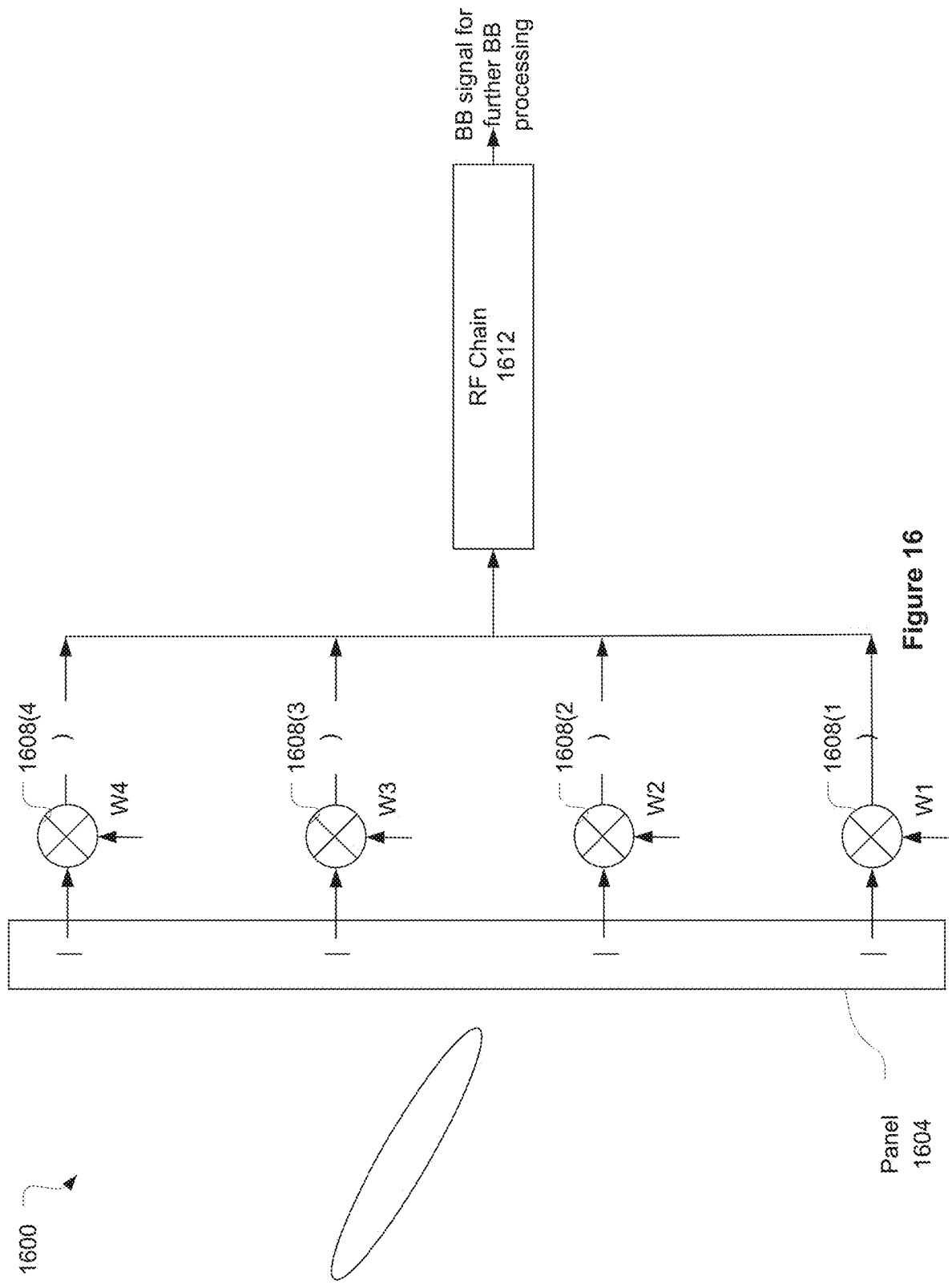

CONFIGURING AND USING DEVICE-TO-DEVICE DEMODULATION REFERENCE SIGNAL (DMRS)

CROSS-REFERENCE TO RELATED APPLICATIONS

This application is a U.S. National Phase of International Application No. PCT/CN2021/102436, filed Jun. 25, 2021, the entire contents and disclosures of which is incorporated herein by reference.

BACKGROUND

Fifth generation mobile network (5G) is a wireless standard that aims to improve upon data transmission speed, reliability, availability, and more. This standard, while still developing, includes numerous details relating to using channels between devices, such as between base stations and user equipment (UE) or between UEs. In the latter case, a channel between UEs can be referred to as a sidelink channel.

BRIEF DESCRIPTION OF THE DRAWINGS

FIG. 5 illustrates an example of a resource grid for DMRS transmission using a configuration that involves multiple CDM groups, in accordance with some embodiments.

FIG. 6 illustrates an example of a resource grid for DMRS transmission using a configuration that involves power boosting, in accordance with some embodiments.

FIG. 7 illustrates an example of an operational flow/algorithmic structure for a device to configure DMRS transmission using a CDM group that is associated with more than two antenna ports, in accordance with some embodiments.

FIG. 8 illustrates an example of an operational flow/algorithmic structure for a device to receive DMRS using a CDM group that is associated with more than two antenna ports, in accordance with some embodiments.

FIG. 9 illustrates an example of a resource grid for DMRS transmission using a configuration that involves more than four DMRS locations, in accordance with some embodiments.

FIG. 10 illustrates another example of a resource grid for DMRS transmission using a configuration that involves more than four DMRS locations, in accordance with some embodiments.

FIG. 12 illustrates an example of an operational flow/algorithmic structure for a device to receive DMRS using more than four DMRS locations, in accordance with some embodiments.

FIG. 14 illustrates an example of an operational flow/algorithmic structure for a device to configure DMRS transmission using slot aggregation, in accordance with some embodiments.

FIG. 15 illustrates an example of an operational flow/algorithmic structure for a device to receive DMRS using slot aggregation, in accordance with some embodiments.

FIG. 16 illustrates an example of receive components, in accordance with some embodiments.

DETAILED DESCRIPTION

Figure 1:
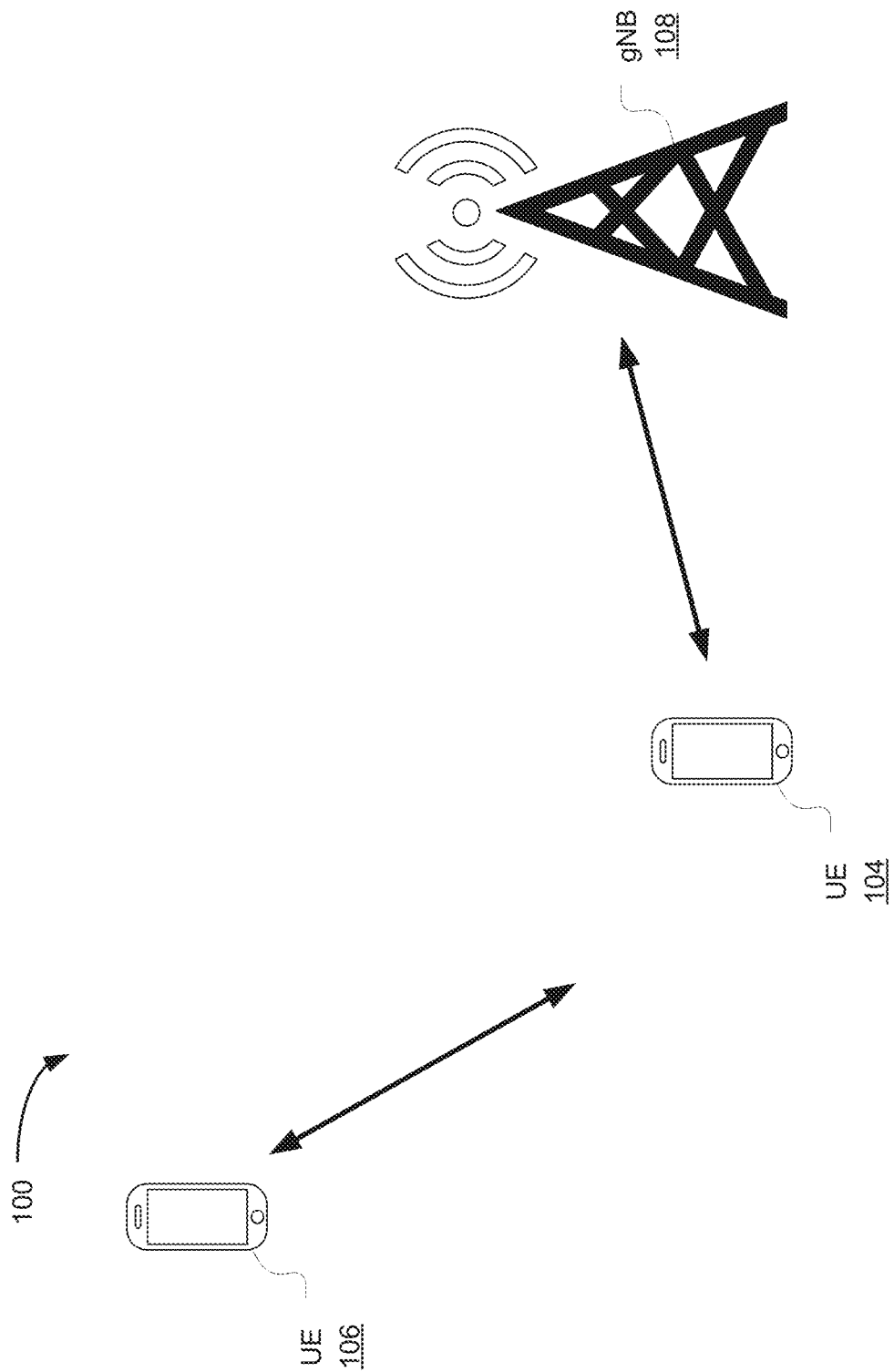
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a first device can communicate with a second device in a device-to-device communication scheme. This type of communication can occur over a sidelink channel, referred to in 5G cellular networks as a physical sidelink shared channel (PSSCH). Demodulation reference signals (DMRSs) can be used to estimate the channel quality of the PSSCH. To improve the flexibility, scalability, and/or related communication resource usage (e.g., physical resource allocations in channels, device power consumption, device processing burden) for DMRS transmission/reception, embodiments of the present disclosure provide for one or more of: using a configuration for the DMRS transmission/reception that involves a code division multiplexing (CDM) group associated with more than two antenna ports, using a configuration for the DMRS transmission/reception that involves more than four DMRS locations in a slot, and/or using slot aggregation for measurements associated with DMRSs transmitted/received across multiple slots.

The following is a glossary of terms that may be used in this disclosure.

The term "circuitry" as used herein refers to, is part of, or includes hardware components, such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, device, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a device of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications, such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include DMRSs for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

The UE 104 and the gNB 108 may perform beam management operations to identify and maintain desired beams for transmission in the uplink and downlink directions. The beam management may be applied to both PDSCH and PDCCH in the downlink direction, and PUSCH and PUCCH in the uplink direction.

In an example, communications with the gNB 108 and/or the base station can use channels in the frequency range 1 (FR1) band, frequency range 2 (FR2) band, and/or high frequency range (FRH) band. The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

As further illustrated in FIG. 1, the network environment 100 may further include another UE 106, with which the gNB 108 can connect in a similar manner as the gNB 108-UE 104 connection. The UE 104 can also connect to UE 106 by using sidelink channels. These sidelink channels can include a PSSCH and a physical sidelink control channel (PSCCH). PSSCH can be analogous to PDSCH and can carry data in a one-to-one or one-to-many scheme. In other words, UE 104 can be a transmitter device that transmits data to one or more devices (including UE 106) on the PSSCH, or can be a receiver device in a set of devices that receive data from the UE 106 on PSSCH. PDSCH can be analogous to PDCCH and can carry sidelink control information (SCI). SCI is similar to DCI and includes information about the resource allocation of the PSSCH.

To receive data on the PSSCH, a device (e.g., the UE 106 receiving data from the UE 104) needs to estimate the channel of the PSSCH. DMRS can be sent in the PSSCH for the channel estimation. Relative to the use of DMRS for PDSCH, the configuration of the DMRS for PSSCH is typically more restricted. This configuration is described in the next figures.

Figure 2:
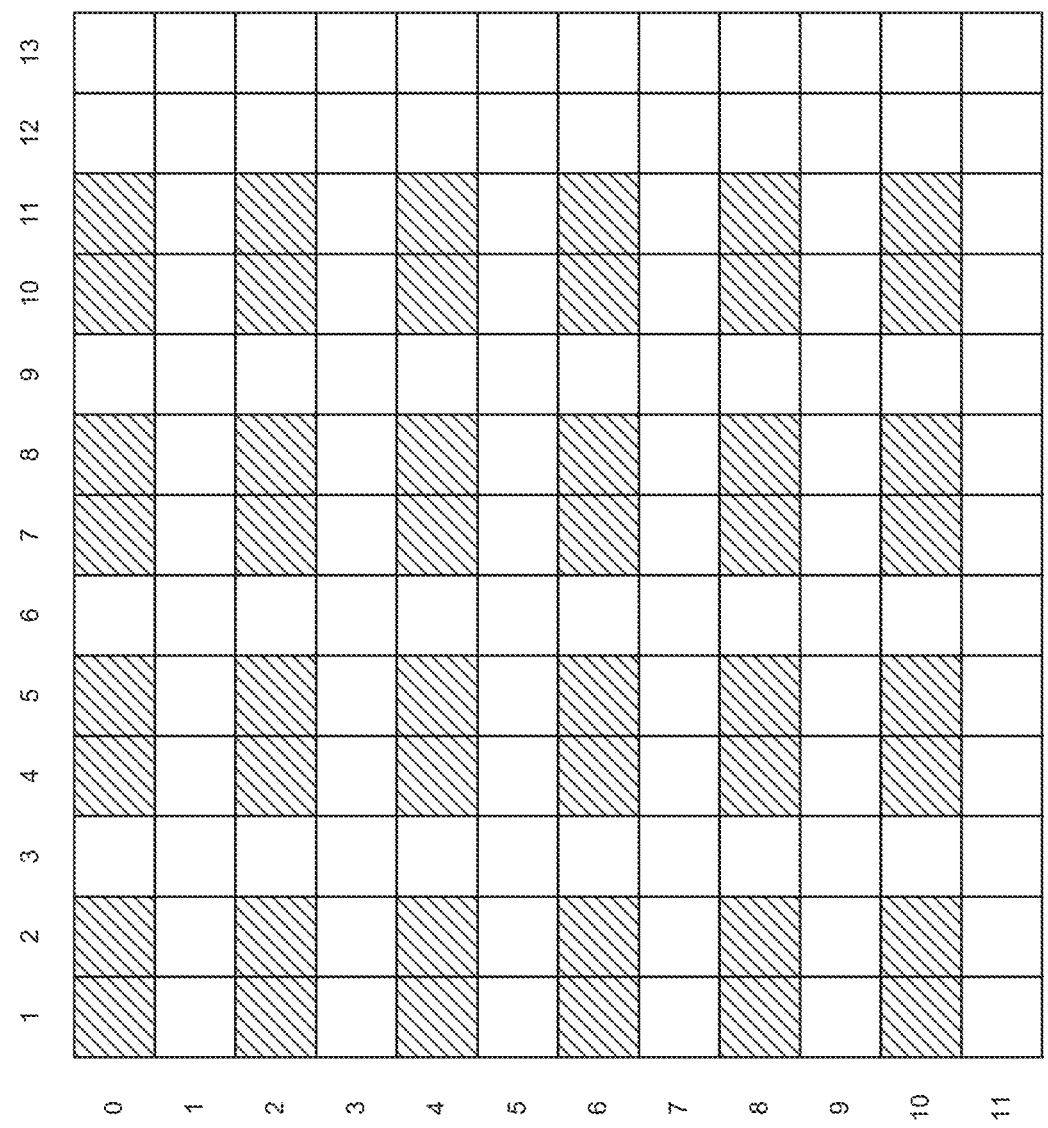
FIG. 2 illustrates an example of a resource grid usable for demodulation reference signal (DMRS) transmission, in accordance with some embodiments.

FIG. 2 illustrates an example of a resource grid usable for DMRS transmission, in accordance with some embodiments. This resource grid illustrated from the perspective of a transmitter device (e.g., UE 104) that configures a resource pool for a receiver device (e.g., UE 106), where this resource pool includes resource elements usable to carry DMRSs. However, this resource grid equivalently applies to the receiver device.

Generally, a resource pool is a set of resources defined by a subset of subframes and resource blocks available within these subframes. The block of resources is repeated with a period, known as the PSCCH period. The resource pool sets aside physical resources for transmission of sidelink data (including associated control). A resource element (RE) is smallest physical resource and includes one subcarrier during one OFDM symbol. A resource block includes a set of consecutive carriers in the frequency domain (e.g., twelve of them). In the time domain, a frame includes multiple subframes, each of which in turn includes a number of slots. A slot is formed by a number of symbols, such as OFDM symbols.

The resource pool can be represented using a resource grid 200, showing the time-domain resources on the horizontal axis and the frequency-domain resources on the vertical axis. As illustrated, the resource grid 200 shows a slot including thirteen symbols (numbered "1" through "13" on the horizontal axis) and twelve subcarriers (numbered "0" through "11" on the vertical axis). Each illustrated square represents a resource element. Each square marked with diagonal lines represents a resource element that carries DMRS.

For sidelink channels, typically DMRS Type 1 is used with a time domain pattern of two, three, or four symbols (or time domain density). Type 1 relates to a frequency domain pattern (or frequency domain density), whereby every other resource element in the frequency domain is occupied by DMRS. The time domain pattern indicates the positions (also, sometime, referred to as location or DMRS location) in the time domain of the resource element that is occupied by DMRS (e.g., two locations, three locations, or four locations in a slot). The time pattern is selected by the transmitter device based on, for instance, the speed at which the transmitter device and/or receiver device is traveling or the used modulation coding scheme (MCS), and is indicated to the receiver device in SCI. A DMRS is mapped to physical resources using a Gold sequence and an orthogonal cover code (OCC). To observe orthogonality and given the time domain and frequency domain patterns, the configuration defined for the DMRS transmission in a PSSCH is typically mapped to two antenna ports and a DMRS location having a DMRs length of two symbols (e.g., a first OFDM symbol at a first position equal to the DMRS location, and a second OFDM symbol at a second position that is adjacent to the first position). Hence, a single CDM group can be defined, where this CDM group is associated with two antenna ports (e.g., antenna ports p "1000" and "1001"; this CDM group can be referred to as a two-port DMRS CDM group) can support the Type 1 pattern with the two, three, or four symbol time domain pattern and the two symbols length.

The above DMRS configuration (e.g., as shown in FIG. 2) is suitable for device-to-device communications, where such devices are located in vehicles. The coverage is limited to about one-hundred forty decibels of maximum coupling loss. However, device-to-device communications can cover other use cases, where these devices are, for instance, mobile devices (e.g., smartphones) and/or accessories thereof (e.g., smart watches). In these and other use cases, longer or different distance communications between devices (e.g., more than ten kilometers) with non-line of sight (NLOS) channels may be needed. This need can be translated to about one-hundred sixty decibels of maximum coupling loss (e.g., an additional twenty decibels).

Figure 13:
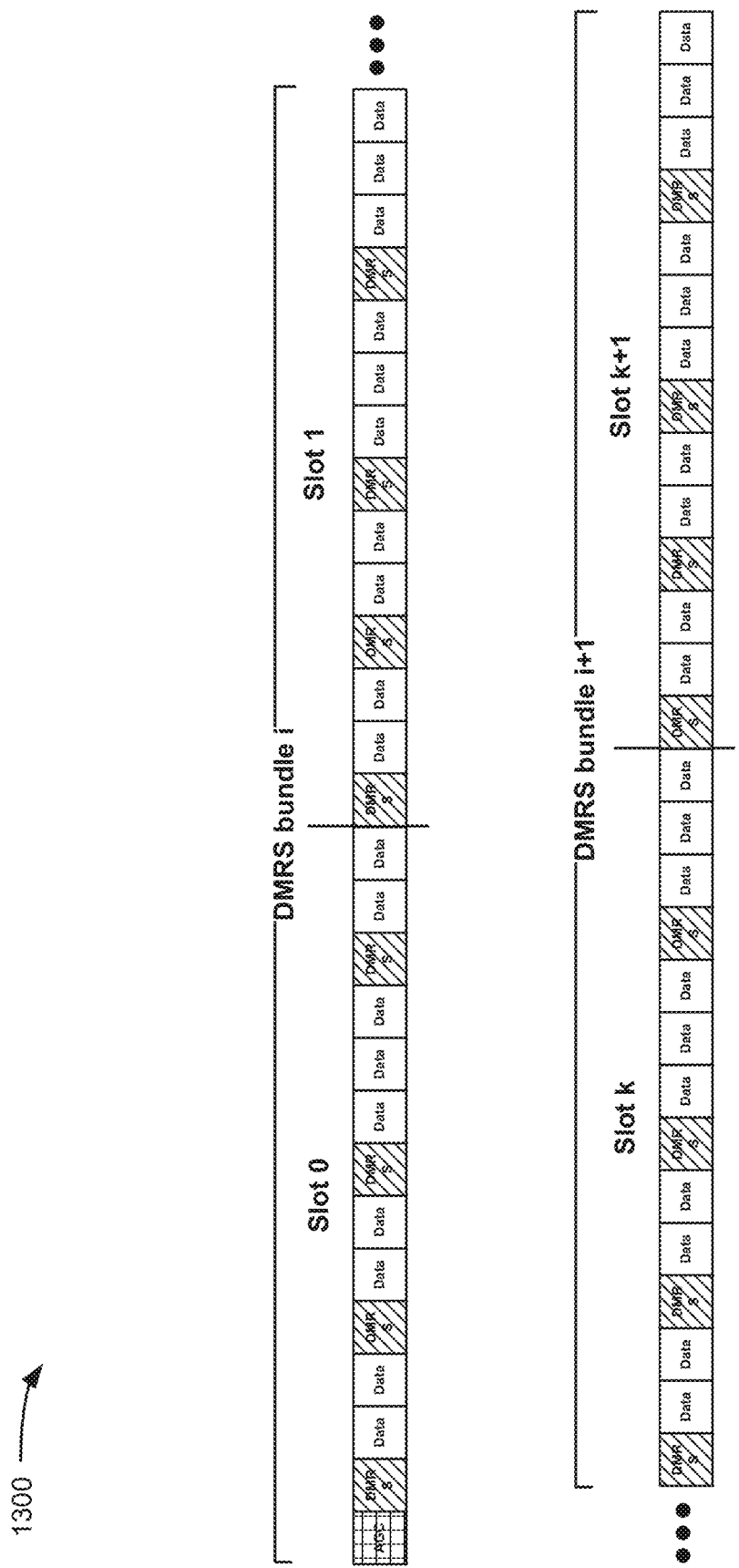
FIG. 13 illustrates an example of a slot aggregation for DMRS, in accordance with some embodiments.

In such use cases, the use of the Type 1 pattern with the two, three, or four symbol time domain pattern may not satisfy the needs. Thus, a more the flexible, scalable, and/or efficient communication resource usage (e.g., physical resource allocations in channels, device power consumption, device processing burden, etc.) for DMRS transmission/ reception, embodiments of the present disclosure provide for one or more of: using a configuration for the DMRS transmission/reception that involves CDM group associated with more than two antenna ports, using a configuration for the DMRS transmission/reception that involves more than four DMRS locations in a slot, and/or using slot aggregation for measurements associated with DMRSs transmitted/received across multiple slots. The use of more than two antenna ports is illustrated in FIGS. 4-8. The use of more than four DMRS locations is illustrated in FIGS. 9-12. And the use of slot aggregation is illustrated in FIGS. 13-15.

Figure 3:
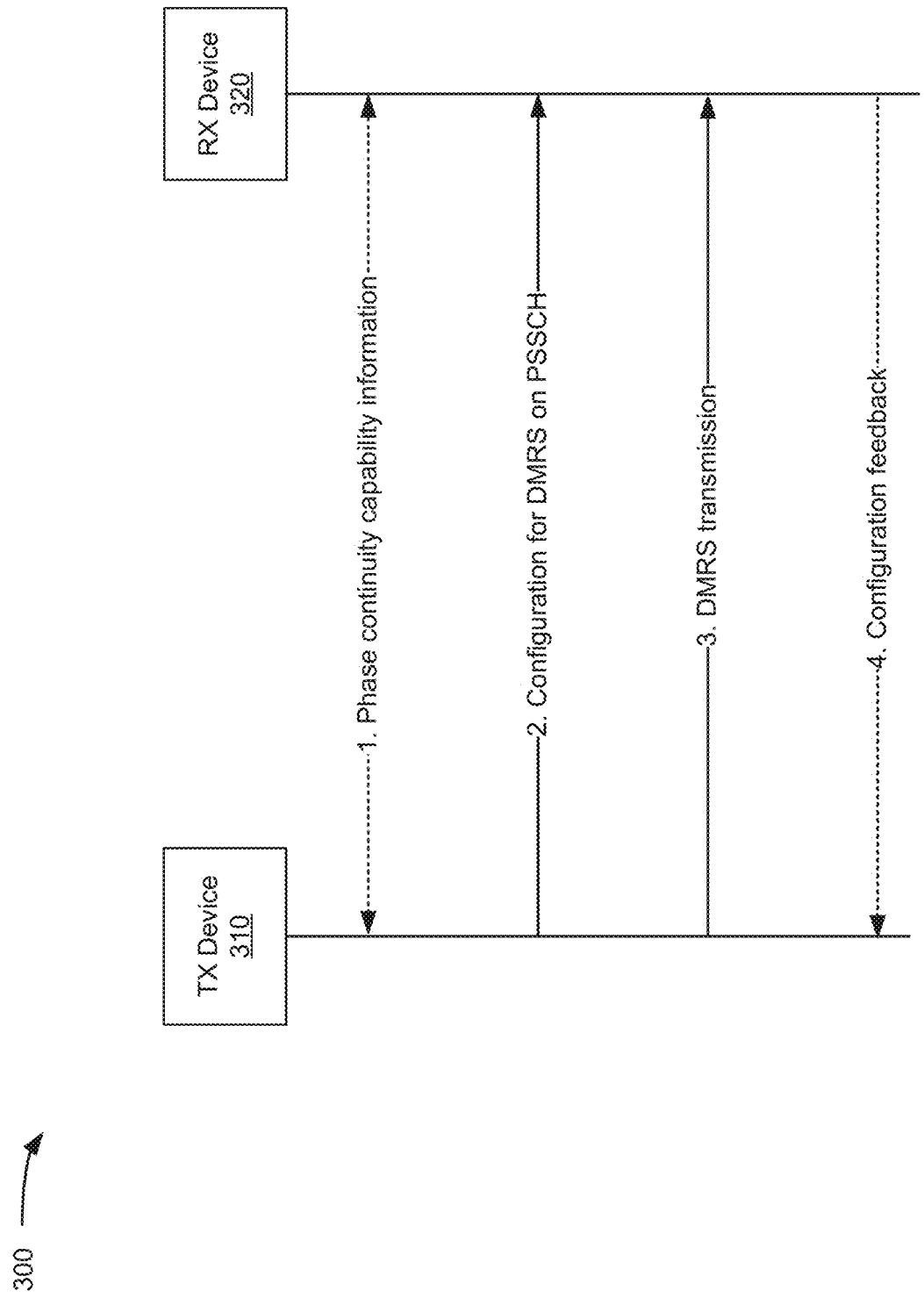
FIG. 3 illustrates an example of a sequence diagram between a transmitter device and a receiver device for using DMRS, in accordance with some embodiments.

FIG. 3 illustrates an example of a sequence diagram 300 between a transmitter device 310 and a receiver device 320 for using DMRS, in accordance with some embodiments. A sidelink channel, such as PSSCH, exists between the transmitter device 310 and the receiver device 320. The transmitter device 310 can be a UE or a base station. Likewise, the receiver device 320 can be a UE or a base station. The transmitter device 310 typically configures physical resources for DMRS transmitting to the receiver device 320. In comparison, the receiver device 320 receives DMRS based on the configuration, performs DMRS measurements, and performs a channel estimation of the sidelink channel (e.g., PSSCH) based on the DMRS measurements.

In an example, the sequence diagram 300 includes the transmitter device 310 and the receiver device 320 exchanging capability information. In particular, the transmitter device 310 can indicate to the receiver device 320 its capability for phase continuity, such as whether the transmitting device 310 is capable of maintaining a phase after a duplex direction change. Likewise, the receiver device 320 can indicate its phase continuity capability to the transmitter device 310. As further described in FIGS. 13-15, the phase continuity capability can impact how slot aggregation is used for DMRS transmission/reception. A phase continuity capability can be indicated using higher layer signaling, such as RRC signaling (e.g., as an information element in an RRC message).

Next, the sequence diagram 300 includes the transmitter device generating a configuration for the DMRS transmission in the sidelink channel and indicating this configuration to the receiver device 320. The configuration can involve any or a combination of a CDM group that is associated with more than two antenna ports, the use of more than four DMRS locations in a slot, and/or the use of slot aggregation. In one example, the configuration is indicated using higher layer signaling, such as RRC signaling (e.g., as a set of information elements in one or more RRC messages). In another example, different potential configurations are indicates using RRC signaling (e.g., multiple resource pools) and the selection of a particular configuration is indicated using SCI (e.g., one of the resource pools is indicated as being selected in the SCI). In yet another example, SCI can be used to indicate the configuration.

As further illustrated in FIG. 3, the sequence diagram 300 includes the transmitting device 310 transmitting, to the receiving device 320, DMRSs in the sidelink channel. For example, the DMRSs are mapped to physical resources of the sidelink channel based on the configuration and the DMRS transmission occurs based on this mapping.

The receiver device 320 receives the DMRSs based on the configuration, performs various DMRS-related measurements, and estimates the sidelink channel for demodulation. In addition, the receiver device 320 can send feedback about the configuration to the transmitter device 310. This feedback allows the transmitter device 320 to dynamically change the configuration (e.g., where a loop may exist back to the second step of the sequence diagram 300). As further described in connection with the next figures, different types of information can be included in the feedback including for instance, channel-related information (e.g., channel quality, pathloss, RSRP measurements, etc.) and/or configuration-related information (e.g., the receiver device's 320 recommendation for using another configuration in subsequent DMRS transmissions). The feedback can be sent via, for example, RRC signaling.

Figure 4:
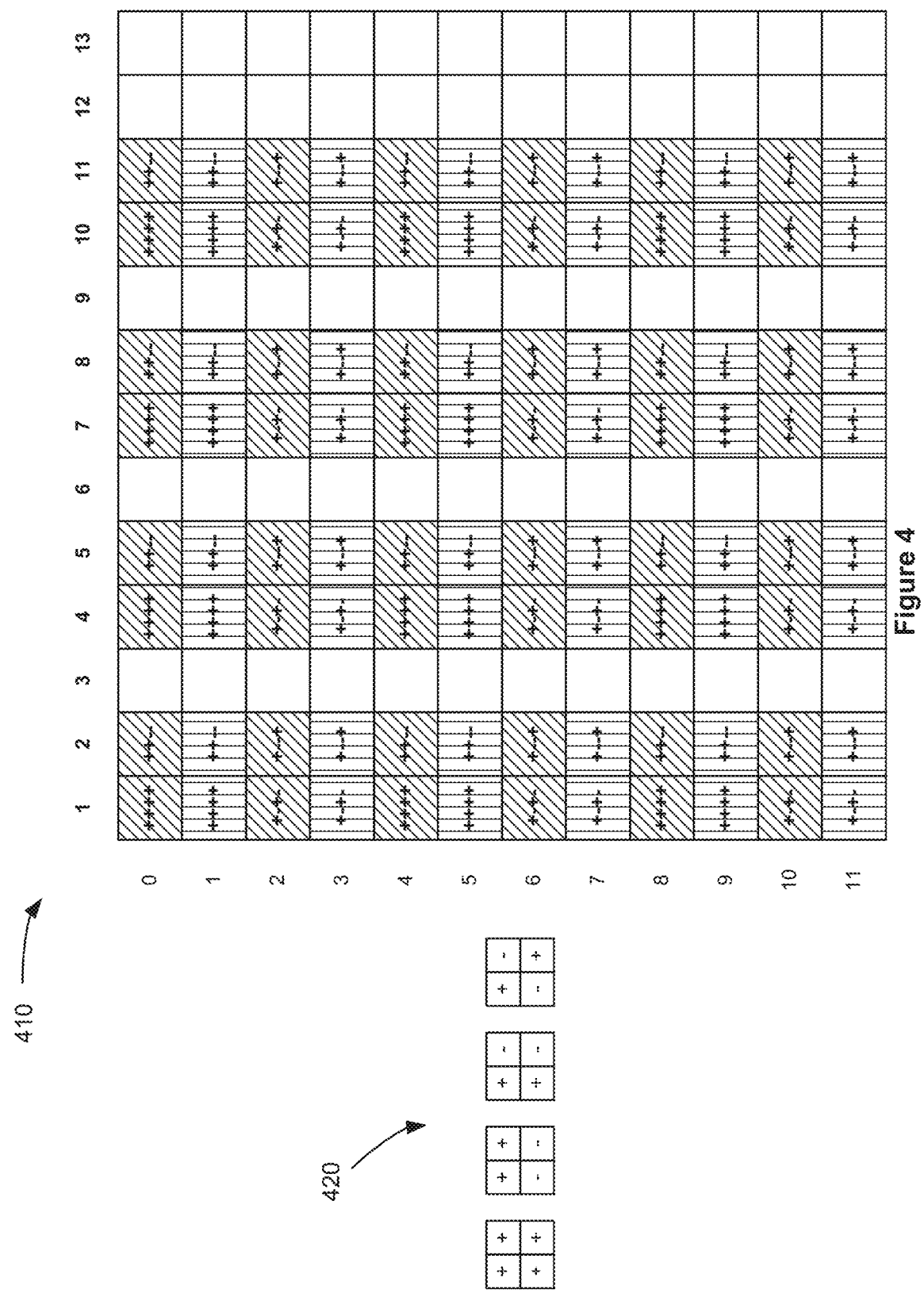
FIG. 4 illustrates an example of a resource grid for DMRS transmission using a configuration that involves a code division multiplexing (CDM) group associated with more than two antenna ports, in accordance with some embodiments.

FIG. 4 illustrates an example of a resource grid 410 for DMRS transmission using a configuration that involves a CDM group associated with more than two antenna ports, in accordance with some embodiments. In this example, the resource grid 410 supports a multiple input multiple output (MIMO) system. To do so, orthogonality of DMRS transmission is needed. The orthogonality can be achieved in one or a combination of methods that involve: the frequency domain pattern (e.g., DMRS Type 1 or Type 2), the time domain pattern (e.g., the number of DMRS locations), and the OCC used. In the illustration of FIG. 4, DMRS Type 1 is used with a four DMRS locations pattern (although a different DMRS location pattern is possible, such as one using two or three locations or one using more than four locations (e.g., as in FIGS. 8-12)). Relative to FIG. 2, the change relates to using an OCC 420 such that the CDM group is associated with more than two antenna ports.

In the example of FIG. 4, the OCC 420 includes a pattern of four two-by-two resource elements: the first one being a $$\begin{matrix} + & + \\ + & + \end{matrix}$$

pattern, the second one being a $$\begin{matrix} + & + \\ - & - \end{matrix}$$

pattern, the third one being a $$\begin{matrix} + & - \\ + & - \end{matrix}$$

pattern, and the fourth one being a $$\begin{matrix} + & - \\ - & + \end{matrix}$$

pattern. The four patterns can be mapped to four antenna ports (e.g., antenna ports "1000," "1001," "1002," "1003"). These four ports are associated with the same CDM group (e.g., CDM group "0"). Of course, a different pattern is possible and can be mapped to the same number of antenna ports or to a different number of antenna ports (e.g., to eight antenna ports, in which case the CDM group is associated with the eight antenna ports).

The resource grid 410 represents a superimposition of four resource grids, each corresponding to the DMRS transmission using one of the four antenna ports. For example, for the illustrated resource element at OFDM symbol "1" and subcarrier "0," a "++++" pattern is indicated. This corresponds to using the $$\begin{matrix} + & + \\ + & + \end{matrix}$$

pattern for the DMRS transmission across the four antenna ports (e.g., the actual transmission using four resource elements, one per antenna port). The CDM group corresponds to the actual four transmitted resource elements.

In the resource grid 410, the DMRS transmission according to the CDM group that corresponds to the four antenna ports is illustrated with the square marked with the diagonal lines. In the time domain, four DMRS locations with a two symbols length are used (e.g., at locations "1," "4," "7," and "10"). By considering the frequency domain only, the orthogonality is provided by using two different OCC patterns across every other possible subcarrier (e.g., the subcarrier pattern depends on the used Type 1 pattern). By considering the time domain only, the orthogonality is provided by using two other different OCC patterns for adjacent resource elements.

Given the Type 1 pattern, it is also possible to define at least a second CDM group that is shifted, in the frequency domain, relative to first CDM group by one subcarrier. This second CDM group can be defined using the same OCC 420 such that the second CDM group is mapped to four other antenna ports (e.g., antenna ports "1004," "1005," "1006," and "1008"). In the resource grid 410, the DMRS transmission according to the second CDM group that corresponds to these four antenna ports is illustrated with the squares marked with the vertical lines.

By comparing the resource element at OFDM symbol "1" and subcarrier "0" to the resource element at OFMD symbol "1" (e.g., at the same time domain position) and subcarrier "1" (e.g., at a subcarrier offset of one), the same "++++" pattern is indicated. The use of the same OCC pattern is possible because of the Type 1 pattern.

As such, it is possible to configure one or more CDM groups, each of which is associated with four antenna ports (or a different number of antenna ports larger than two). This configuration for the DMRS transmission in a sidelink channel (e.g., PSSCH) is summarized in Table 1 below.

TABLE 1

| Antenna port | CDM Group λ | $w_f(k')$ k' = 0 | $w_f(k')$ k' = 1 | $w_t(l')$ l' = 0 | $w_t(l')$ l' = 1 |
|---|---|---|---|---|---|
| 1000 | 0 | +1 | +1 | +1 | +1 |
| 1001 | 0 | +1 | −1 | +1 | +1 |
| 1002 | 0 | +1 | +1 | +1 | −1 |
| 1003 | 0 | +1 | −1 | +1 | −1 |
| 1004 | 1 | +1 | +1 | +1 | +1 |
| 1005 | 1 | +1 | −1 | +1 | +1 |
| 1006 | 1 | +1 | +1 | +1 | −1 |
| 1007 | 1 | +1 | −1 | +1 | −1 |

Figure 5:
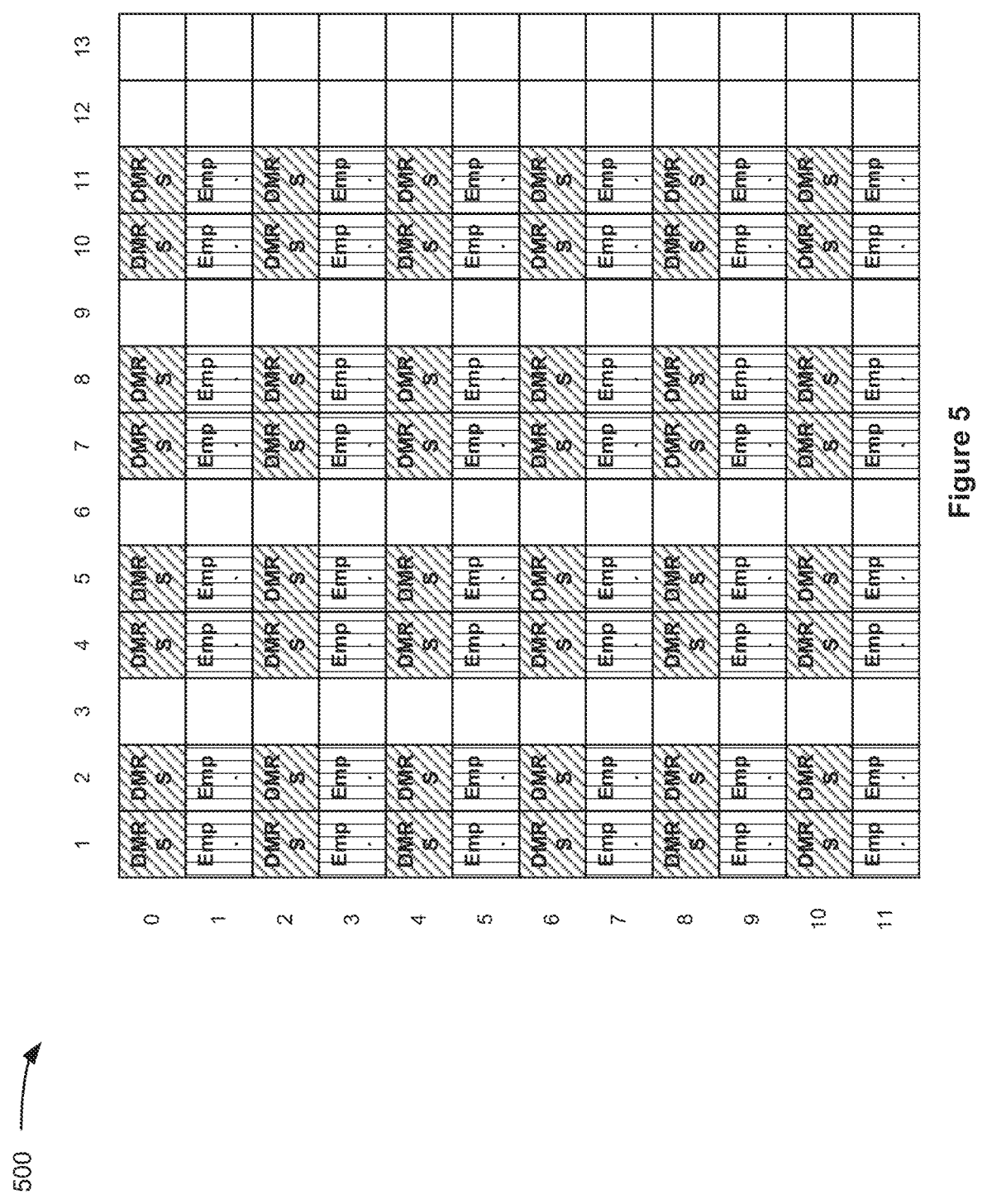

FIG. 5 illustrates an example of a resource grid 500 for DMRS transmission using a configuration that involves multiple CDM groups, in accordance with some embodiments. As described herein above, a CDM group can be configured for a receiver device and can be associated with more than four antenna ports. Further, multiple such CDM groups can be configured by the transmitter device for use with the same receiver device or with multiple receiver devices (e.g., a first CDM group using the even numbered subcarriers is configured for a first receiver device, a second CDM group using the odd numbered subcarriers is configured for a second receiver device). As such, the transmitter device can indicate to a receiver device the CDM groups (or the antenna ports of these CDM groups) that are configured for the device by using, for instance, SCI. Some of these configured CDM groups can be used for DMRS transmission to the receiver device, while remaining one of the configured CDM groups may not be used (e.g., in this case, the transmitter device can have the flexibility to use these remaining CDM groups for DMRS transmission to another device). In this case, the transmitter device can also indicate, to the receiver device, whether a configured CDM group is used or not by using, for instance, SCI. However, regardless of whether a configured CDM group is used or not, the receiver UE can perform rate matching for data on the sidelink channel (e.g., PSSCH rate matching) to all configured CDM groups.

In the illustration of FIG. 5, two CDM groups are configured for a receiver device in SCI. The first CDM group (or sets of such a group) is indicated with the rectangles marked with the diagonal lines. The second CDM group (or sets of such a group) is indicated with the rectangles marked with the vertical lines. As shown with the label "DMRS" in each rectangle, the first CDM group is used for the DMRS transmission to the receiver device and can contain the scheduled DMRS ports to receiver device (e.g., antenna ports "1000" through "1003"). In comparison, and as shown with the label "Emp." (an abbreviation of "empty") in each rectangle, the second CDM group does not contain DMRS transmission (e.g., PSSCH resource elements that carry DMRS) or scheduled DMRS ports (e.g., an indication that antenna ports "1004" through "1007" are scheduled for DMRS transmission). Remaining resource elements (shown with blank rectangles) carry data of the sidelink channel (e.g., PSSCH data).

Here, the SCI indicates that the first and second CDM groups are configured for the receiver device. The SCI may also, but need not, indicate that the second CDM group is actually not used (or, equivalently, that only the first CDM group is used). In both cases, the receiver device performs PSSCH rate matching to all the configured CDM groups as indicated in the SCI. For instance, the receiver device can determine that resource element at subcarrier "1" and OFDM symbol "0" corresponds to the second CDM group (shown in FIG. 5 as being "empty" because it does not carry DMRS) and may not look to decode PSSCH data that may, otherwise, have been carried in this resource element.

Figure 6:
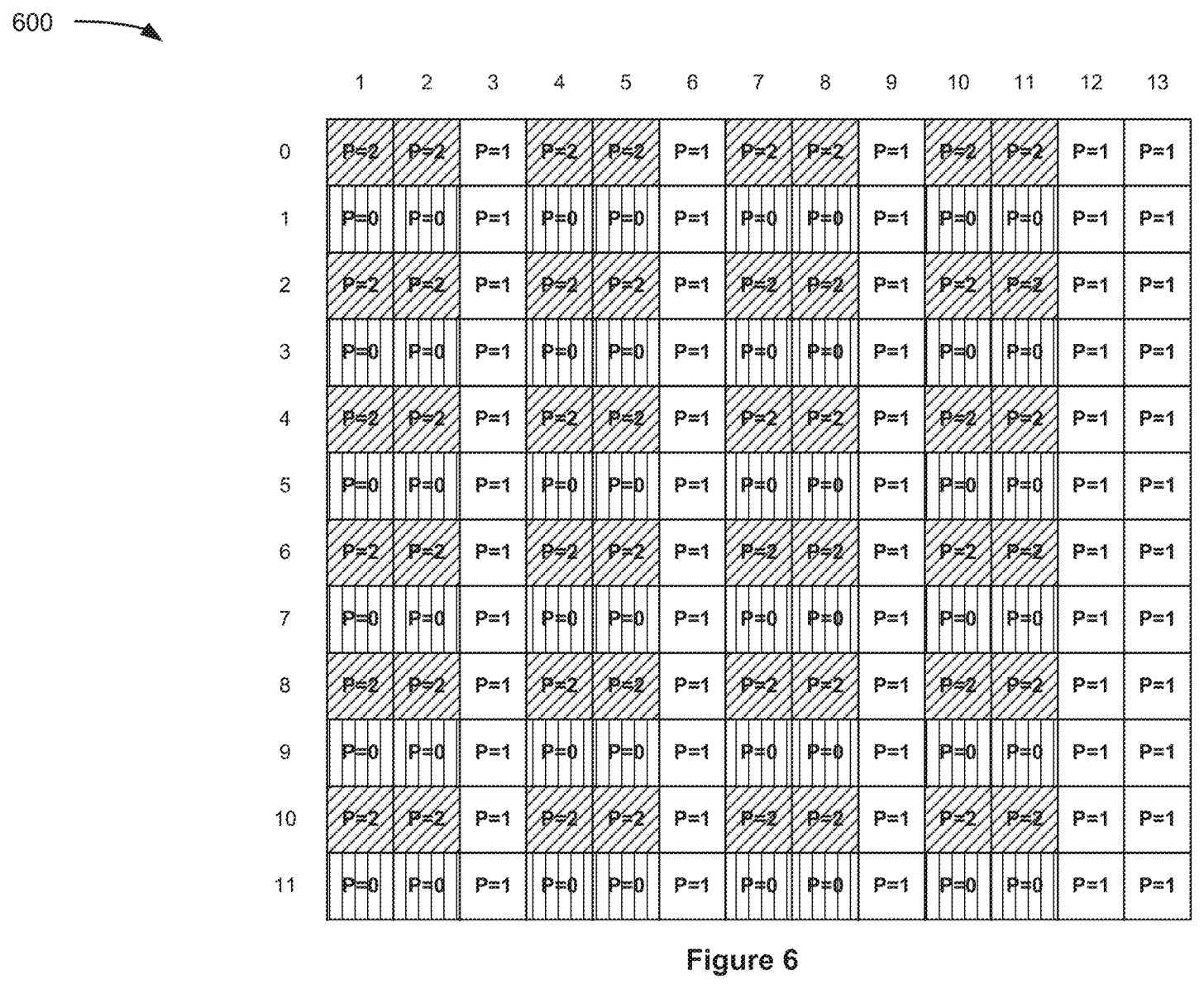

FIG. 6 illustrates an example of a resource grid 600 for DMRS transmission using a configuration that involves power boosting, in accordance with some embodiments. As described herein above, a CDM group can be configured for a receiver device and can be associated with more than four antenna ports. Further, multiple such CDM groups can be configured by the transmitter device and the receiver device can perform rate matching of the sidelink data (e.g., PSSCH rate matching) around resource elements in the CDM groups (regardless if actually used for the DMRS transmission or not). When a second CDM group is configured for the receiver device but not used for an actual DMRS transmission (as indicated with a rectangle marked with vertical lines as shown in FIG. 5), power spectrum density (PSD) can be boosted for an actual DMRS transmission using a first CDM group that is also configured for the receiver device. The boosting includes increasing the PSD by a scaling factor (P) (e.g., a multiplier greater than one) to improve the DMRS coverage. For instance, the power boost scaling factor (P) is equal to the total number of configured CDM groups ($N_{configured}$) divided by the total number of CDM groups used for actual DMRS transmission to the receiver device ($N_{used}$) (e.g., $P=N_{configured}/N_{used}$).

Similar to the illustration of FIG. 5, in the illustration of FIG. 6, two CDM groups are configured for a receiver device in SCI. The first CDM group (or sets of such a group) is indicated with the rectangles marked with the diagonal lines. The second CDM group (or sets of such a group) is indicated with the rectangles marked with the vertical lines. The first group is used for DMRS transmission to the receiver device. However, the second group is not used for the DMRS transmission (e.g., in FIG. 5, this is shown correspondingly with the "empty" label). Using the above scaling factor formula, the power boosting scaling factor is two. As such, the DMRS transmission using the first CDM group has a PSD boosted by two (shown in FIG. 6 with "P=2"). No DMRS transmission occurs by using the second CDM group (e.g., this non-use is indicated with the power boost scaling factor "P=0" to indicate that no power is used for this second CDM group). In comparison, the transmission of the sidelink data (e.g., using the PSSCH resource elements) is not boosted (as indicated with the power boost scaling factor "P=1").

Hence, and as described in connection with FIGS. 4-6, improvements to the DMRS transmission are possible by using a CDM group that is associated with more than two antenna ports. Additional improvements are also possible by configuring more than one CDM group and, as needed, using PSSCH rate matching according to the configuration and using power boosting depending on the actual use of each CDM group. Other improvements are also possible by varying the DMRS length and/or using feedback information to change the configuration.

In an example, the DMRS length represents the number of DMRS symbols used at each DMRS locations, such as a length of one or two DMRS symbols. Compares to a single symbol DMRS, a two symbol DMRS (or, more generally, a multiple symbol DMRS) can allow more orthogonal ports to be used among multiple co-scheduled receiver devices and can allow DMRS with higher density (which can improve the receiver performance at a low signal-to-interference-plus-noise ratio (SINR)). However, in certain situations (e.g., high SINR or good channel conditions), the use of a multi-symbol DMRS is not necessary and may not improve the receiver device's performance. In such cases, the use of a single symbol DMRS can improve the overall data throughput because additional OFDM symbols can be available for the transmission of data.

As such, the DMRS length can be dynamically varied by being toggled between a single symbol DMRS and a multi-symbol DMRS. In one example, the receiver device is initially configured to use (or by default uses) a multi-symbol DMRS (e.g., a two-symbol DMRS. The configuration can be sent using master system information (MIB) signaling, system information block (SIB) signaling, or RRC signaling. SCI can be further used to indicate the use of the single symbol DMRS or the multi-symbol DMRS.

Further, the feedback information can be used to toggle between the single symbol DMRS or the multi-symbol DMRS (e.g., to indicate the relevant DMRS length) in SCI transmitted to the receiver device after the transmitter device received the feedback information. The feedback information can include channel-related information. In this case, the transmitter device selects the relevant DMRS length and indicates this selection to the receiver device. Additionally or alternatively, the feedback information can include a DMRS enhancement information. In this case, the receiver device can indicate a preferred or recommended modification to the configuration used for the DMRS transmission and the transmitter device can indicate the actual modification to the receiver device in the SCI. Alternatively, the receiver device can indicate a modification to the configuration and assume that the transmitter device will perform this modification and, in turn, and the transmitter device can perform this modification and, indicate, to the receiver device in the SCI that the modification is made.

In an example, the channel-related feedback information can include any type of information that indicates a quality of the sidelink channel (e.g., the PSSCH). For instance, the channel-related feedback information indicates a distance between the receiver device and the transmitter device. Generally, the larger the distance, the worse the quality becomes (and, thus, the more likely that the multi-symbol DMRS will be toggled to). In another illustration, an RSRP measurement or a pathloss estimation between the receiver device and the transmitter device is indicated. Here, the smaller the RSRP measurement or the larger the pathloss estimation is, the more likely that the multi-symbol DMRS will be toggled to. Similarly, Doppler shift/spread (e.g., speed) estimation between the receiver device and the transmitter device is indicated. Here also, the larger the estimation, the more likely that the multi-symbol DMRS will be toggled to.

The DMRS enhancement feedback information can indicate a change to the configuration. This change can be in the time domain and/or in the frequency domain. For instance, the DMRS enhancement feedback information can indicate the DMRS length (e.g., one or two symbols), and/or the number of DMRS locations (e.g., one DMRS location for one or two DMRS symbols in a slot, two DMRS locations each for one or two DMRS symbols in a slot, three DMRS locations each for one or two DMRS symbols in a slot, or four DMRS locations each for one or two DMRS symbols in a slot). In addition, the need for PSD boosting and/or a recommended power boost scaling factor can be indicated.

FIG. 7 illustrates an example of an operational flow/algorithmic structure 700 for a device to configure DMRS transmission using a CDM group that is associated with more than two antenna ports, in accordance with some embodiments. A transmitter device can implement the operational flow/algorithmic structure 700, such as the UE 104 or 106, the transmitter device 310, or the UE 1700 or components thereof, for example, processors 1704.

The operation flow/algorithmic structure 700 may include, at 702, generating, for a receiver device, a configuration of DMRSs for a PSSCH, the configuration indicating a CDM group associated with a plurality of antenna ports, the plurality of antenna ports including more than two antenna ports. For example, the transmitter device can configure the CDM group for the receiver device, wherein this CDM group is associated with four antenna ports or eight antenna ports. This association is based on using an OCC, such as the OCC 420 of FIG. 4. In addition, the transmitter device can configure more than one CDM group for the receiver device and indicate whether one or more of such CDM groups is not in use. The transmitter device can also define a PSD power boosting factor depending on the use of the CDM groups. In addition, the DMRS length and the DMRS location(s) and/or the use of PSD power boosting can be defined in the configuration based on feedback information from the receiver device. As such, the configuration can indicate that, for the PSSCH with the receiver device, and in addition to the use of Type 1, whether a CDM group of more than two antenna ports is used, whether more than one CDM group is used, the DMRS length, the DMRS location(s), and/or the use of PSD power boosting. In an example, multiple configurations are generated for the receiver device, each of which corresponds to a different resource pool for DMRS transmission in the PSSCH.

The operation flow/algorithmic structure 700 may include, at 704, sending, to the receiver device, the configuration. For instance, the configuration can be signaled via RRC messages. Further, specific parameters of the configuration or changes thereto can be signaled via additional RRC messages and/or SCI. In an example, when multiple resource pools are configured, RRC or SCI signaling can be used to indicate a resource pool selection (or, equivalently, a configuration selection) to the receiver UE. This selection can be based on feedback information from the receiver device.

The operation flow/algorithmic structure 700 may include, at 706, sending, to the receiver device, the DMRSs based on the configuration. For instance, the DMRSs to be sent are mapped to the physical resources of the PSSCH according to the configuration, and these physical resources carry the information that the DMRSs include.

FIG. 8 illustrates an example of an operational flow/algorithmic structure 800 for a device to receive DMRS using a CDM group that is associated with more than two antenna ports, in accordance with some embodiments. A receiver device can implement the operational flow/algorithmic structure 800, such as the UE 104 or 106, the receiver device 320, or the UE 1700 or components thereof, for example, processors 1704.

The operation flow/algorithmic structure 800 may include, at 802, determining a configuration of DMRSs for a PSSCH, the configuration indicating a CDM group associated with a plurality of antenna ports, the plurality of antenna ports including more than two antenna ports. For example, the configuration is generated by a transmitter device and can indicate that, for the PSSCH with the receiver device, and in addition to the use of Type 1, whether a CDM group of more than two antenna ports is used, whether more than one CDM group is used, the DMRS length, the DMRS location(s), and/or the use of PSD power boosting. In an example, multiple configurations are generated for the receiver device by the transmitter device, each of which corresponds to a different resource pool for DMRS transmission in the PSSCH. The configuration can be determined based on signaling from the transmitter device. The signaling can use RRC messages. Further, specific parameters of the configuration or changes thereto can be signaled via additional RRC messages and/or SCI. In an example, when multiple resource pools are configured, RRC or SCI signaling can be used to indicate a resource pool selection (or, equivalently, a configuration selection) to the receiver UE.

The operation flow/algorithmic structure 800 may include, at 804, receiving, by using the plurality of antenna ports, the DMRSs on the PSSCH based on the configuration, the DMRSs received in resource elements (REs) corresponding to the CDM group. In an example, the receiver device is configured to use the antenna ports based on the determined configuration.

The operation flow/algorithmic structure 800 may include, at 806, performing, based on the DMRSs, a channel estimation for demodulation of the PSSCH. For instance, the receiver device determines the REs that carry DMRSs to then detect the DMRSs and performs the relevant measurements (e.g., RSRP measurements that are then averaged) of the channel estimation. If PSD power boosting is configured, these measurements account for the scaling factor. Further, the UE can perform PSSCH rate matching when decoding the PSSCH data.

Figure 9:
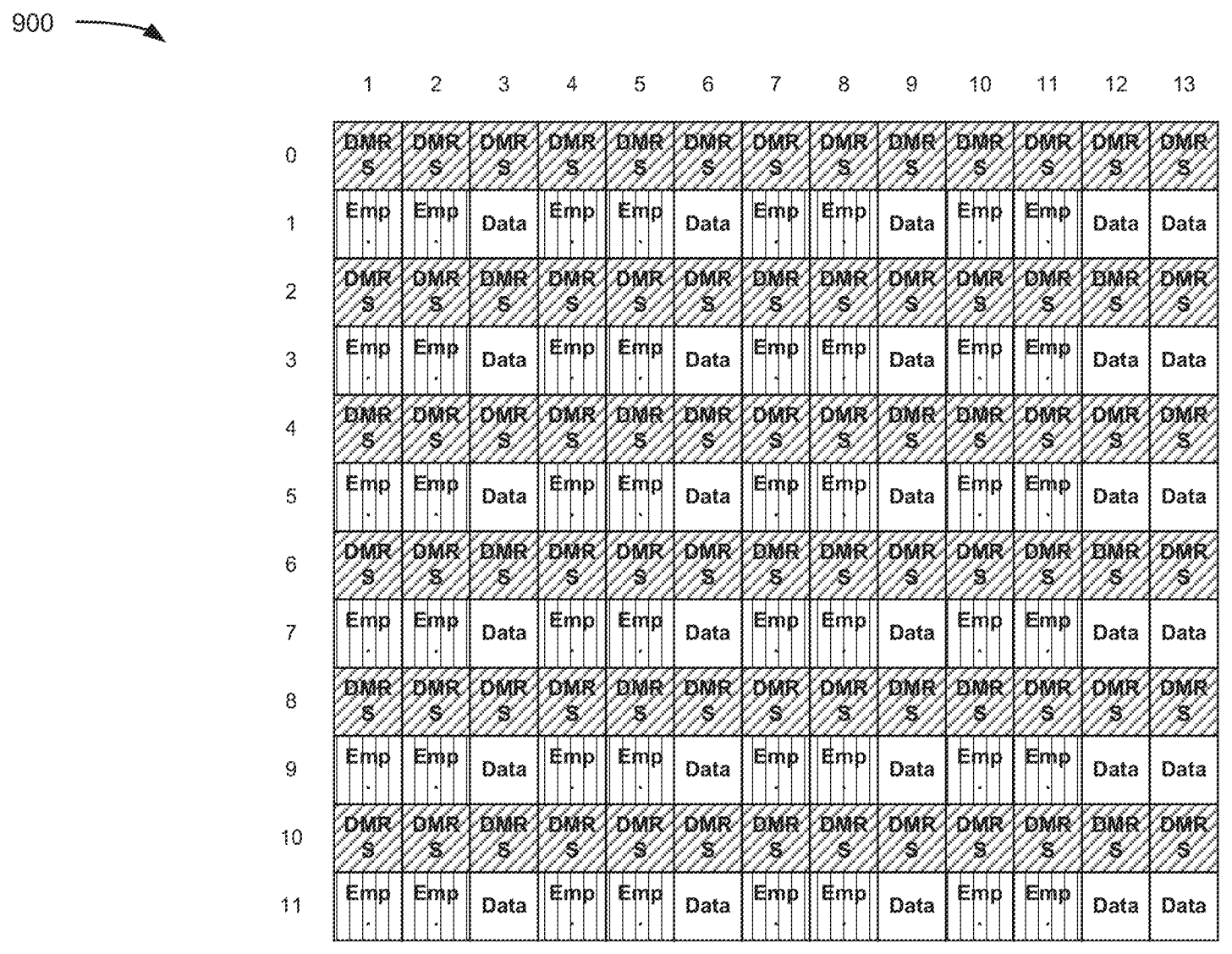

FIG. 9 illustrates an example of a resource grid 900 for DMRS transmission using a configuration that involves more than four DMRS locations, in accordance with some embodiments. The use of more than four DMRS locations can be implemented in conjunction with or independent of the use of a CDM group associated with more than two antenna ports, as previously described herein above and in conjunction with or independent of the use of slot aggregation as further described in FIGS. 13-15. Generally, by using more than four DMRS locations, a higher DMRS density is achieved, which can further enhance the DMRS transmission/reception for low SINR operations. In particular, a low SINR operations, by spending a higher proportion of energy on the DMRS transmission to actual data transmission (e.g., PSSCH data), better channel estimation for demodulation can be achieved, which can improve the reception of the actual data.

As described in connection with FIG. 2, the DMRS density is typically limited to up to four DMRS locations in a slot. Embodiments of the present disclosure relax this limitation by allowing a higher density of more than four DMRS locations and up to all OFDM symbols in the slot. Further, the higher DMRS density can be used in conjunction with PSD boosting. In the time domain, if a DMRS symbol occupies the same position as a data symbol, a power boosting scaling factor of one is used (e.g., the DMRS PSD is the same as the data PSD). However, if the position is not occupied by a data symbol, the DMRS symbol's PSD is boosted by a scaling factor of more than one. Here, the scaling factor depends on the number of OFDM symbols that are not used at that position (e.g., the number of OFDM symbols that do not carry DMRS or data). For instance, if at that position, there are six DMRS symbols (each corresponding to one of six even numbered subcarriers) and six "empty" OFDM symbols (e.g., not being transmitted or having zero PSD, and each corresponding to one of six odd numbered subcarriers), the power boosting scaling factor is set to two.

In the illustration of FIG. 9, the DMRS density is increased such that the DMRS symbols occupy the different OFDM symbols of a slot. This DMRS density is indicated with the rectangles marked with the diagonal lines. Further, the DMRS symbols correspond to a first CDM group configured for the receiver device. This CDM group may, but need not use, more than two antenna ports. A second CDM group may have been configured for the receiver device but is not used (as indicated with the rectangles marked with the vertical lines). The resource elements corresponding to the second CDM group do not carry DMRS or data (and are indicated as being "empty"). The remaining resource elements carry data and are indicated by the blank rectangles having the label "data."

In this illustration, at symbol position "1," there are six DMRS symbols (marked with the "DMRS" label) and six unused OFDM symbols (marked with the "empty" label). Thus, the PSD of each of these six DMRS symbols can be boosted by a scaling factor of two. In comparison, at symbol position "3," there are six DMRS symbols and six data symbols (marked with the "data" label). Thus, the PSD of each of these six DMRS symbols is the same as the PSD of each of the six data symbols.

In an example, the transmitter density can indicate a sidelink DMRS configuration to the receiver device, where this configuration includes the DMRS density and can be indicated via RRC or SCI signaling. The transmitter device can also indicate the user of the PSD boosting and/or the power boosting scaling factor in the configuration. The configuration can also dynamically change over time and the changes only or the entire updated configuration can also be signaled to the receiver device.

Figure 10:
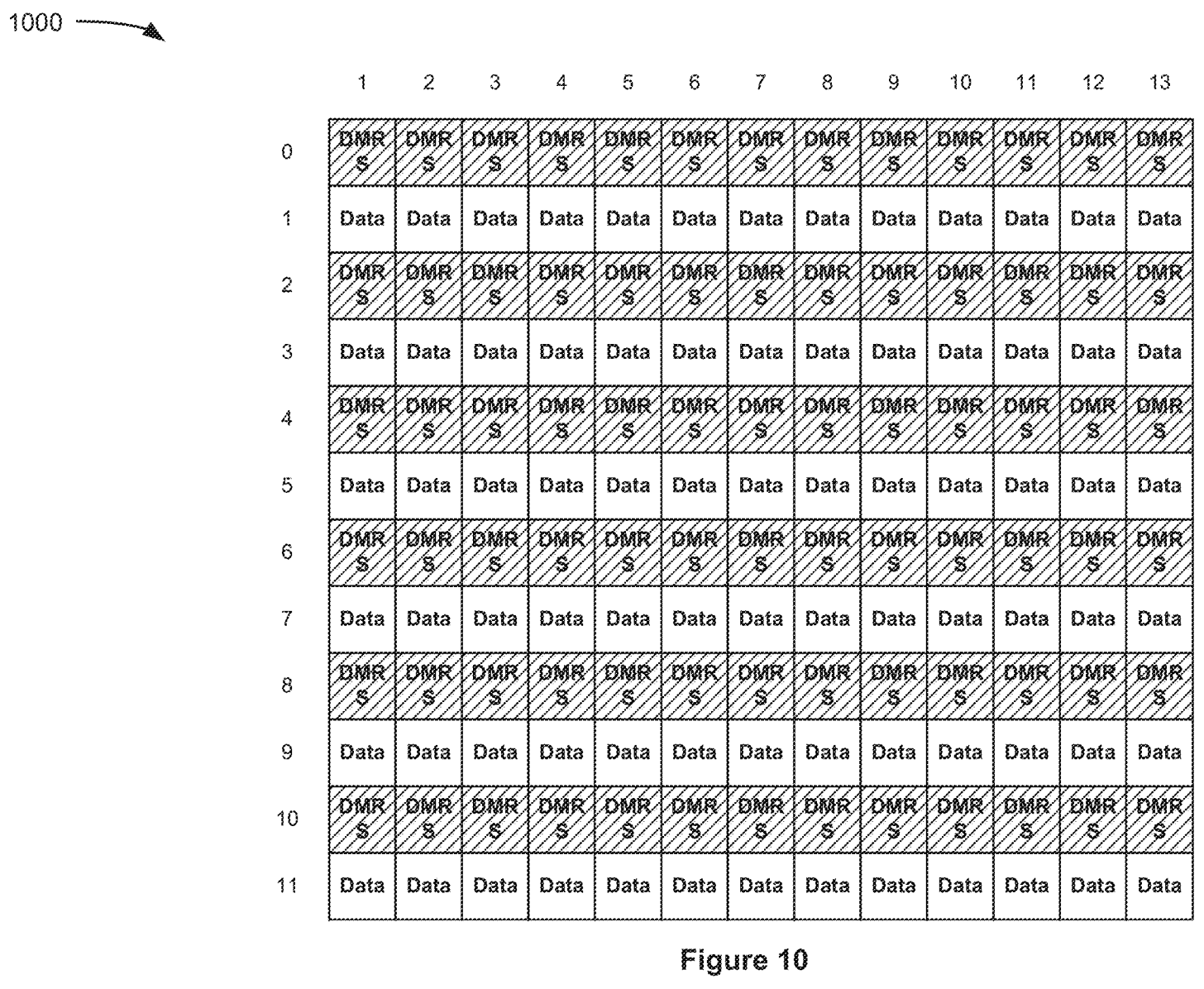

FIG. 10 illustrates another example of a resource grid 1000 for DMRS transmission using a configuration that involves more than four DMRS locations, in accordance with some embodiments. As illustrated, no resource elements are unused. Instead, each resource element either carries DMRS or data. In this case, no power boosting is used (e.g., the power boosting scaling factor is set to one).

In the illustration of FIG. 10, the DMRS density is increased such that the DMRS symbols occupy the different OFDM symbols of a slot. This DMRS density is indicated with the rectangles marked with the diagonal lines. Further, the DMRS symbols correspond to a first CDM group configured for the receiver device. This CDM group may, but need not use, more than two antenna ports. A second CDM group is not configured for the receiver device, or if one was configured, it is reconfigured for the purpose of data transmission. Accordingly, resource elements that do not carry DMRS carry data. These resource elements are indicated by the blank rectangles having the label "data."

In this illustration, at symbol position "1," there are six DMRS symbols (marked with the "DMRS" label) and six data symbols (marked with the "data" label). Thus, the PSD for the transmission of the six DMRS symbols is the same as the one for the transmission of the six data symbols.

Hence, and as described in connection with FIGS. 9-10, improvements to the DMRS transmission are possible by using more than four DMRS locations. Additional improvements are also possible by configuring more than one configuration, each corresponding to a different resource pool and applicable depending on the coverage. Feedback information can be generated by the receiver device and used by the transmitter device and/or receiver device to select the most relevant resource pool and determine the corresponding configuration.

In an example, multiple resource pools, such as up to sixteen resource pools can be configured. A first resource pool (or, equivalently, a first set of multiple resource pools) therefrom can be configured and used to communicate with the receiver device in good coverage (e.g., when in close proximity to the transmitter device, when the channel quality is relatively good, etc.). Conversely, a second resource pool (or, equivalently, a second set of multiple resource pools) can be configured and used to communicate with the receiver device in bad coverage (e.g., when being far away to the transmitter device, when the channel quality is relatively bad, etc.). Generally, the better the device coverage is, the lower the DMRS density is. Other parameters of the configuration can also vary. For instance, the better the device coverage is, the shorter the DMRS length is, the less likely that PSD power boosting is used, and the lower the number of configured CDM groups are. As such, different sidelink DMRS configurations can be defined, each of which corresponds to a different resource pool. Each sidelink DMRS configuration can different from the remaining ones based on whether the DMRS is configured and transmitted in denser time domain pattern, the number of DMRS symbols (e.g., DMRS length) per DMRS time domain location, whether DMRS power boosting density is allowed (e.g., how the PSD scaling factor changes), and the DMRS type in terms of the number of CDM groups and the corresponding OCC patterns.

As such, the DMRS configuration can be dynamically varied by changing the selection of resource pools. In one example, the different configurations of the possible resource pools are indicated to the receiver device by using RRC signaling. Subsequently, a particular resource selection can be indicated to the receiver device via RRC signaling or SCI signaling. Alternatively, the different configurations of the possible resource pools are indicated, by using RRC signaling, to the receiver device and one of them is indicated as a default or fallback configuration. Subsequently, a particular resource selection can be indicated to the receiver device via RRC signaling or SCI signaling, or the receiver device can fallback to using the default configurations.

Feedback information can be sent from the receiver device to the transmitter device to cause a selection of one of the possible configuration. The feedback information can include channel-related information. In this case, the transmitter device selects the relevant configuration and indicates this selection to the receiver device. Additionally or alternatively, the feedback information can include a DMRS enhancement information. In this case, the receiver device can indicate a preferred or recommended selection of the one of the possible configurations, and the transmitter device can indicate the actual selection to the receiver device in the SCI. Alternatively, the receiver device can indicate the selection and assume that the transmitter device will perform the relevant modification and, in turn, and the transmitter device can perform this modification and, indicate, to the receiver device in the SCI that the modification is made.

In an example, the channel-related feedback information can include any type of information that indicates a quality of the sidelink channel (e.g., the PSSCH). For instance, the channel-related feedback information indicates a distance between the receiver device and the transmitter device. In another illustration, an RSRP measurement or a pathloss estimation between the receiver device and the transmitter device is indicated.

In the case of a fallback sidelink DMRS configuration, the receiver device can use this configuration based on one or more triggers to then monitor DMRS transmission. A trigger can be a periodic time interval (e.g., every so often, the receiver uses this configuration for the monitoring). Another trigger can be the loss of communications with the transmitter device or the failure to detect DMRS using a currently selected sidelink DMRS configuration. Yet another trigger can be an RSRP measurement or pathloss estimating having a value within a range or being smaller/larger than a predefined threshold value.

Figure 11:
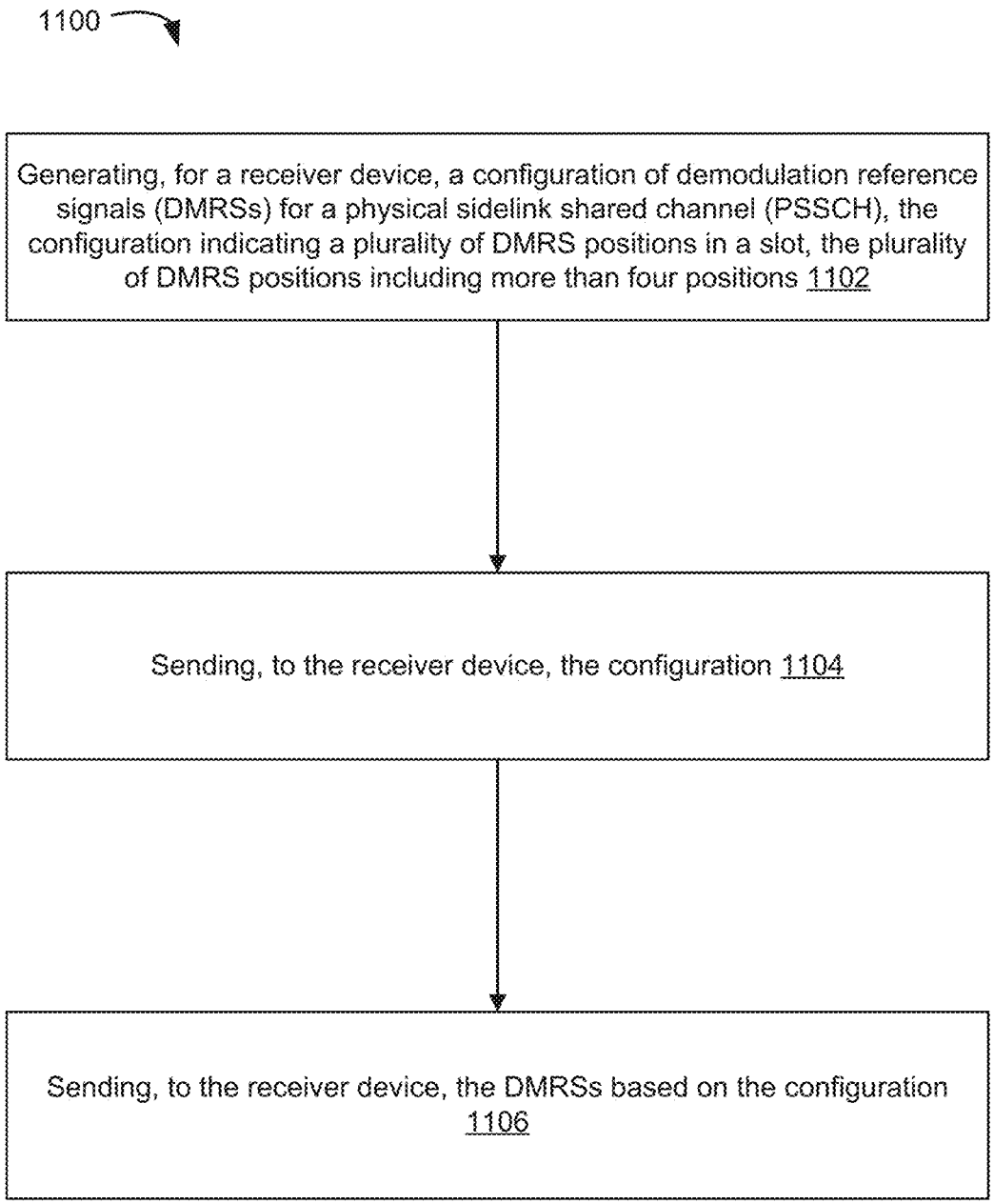
FIG. 11 illustrates an example of an operational flow/algorithmic structure for a device to configure DMRS transmission using more than four DMRS locations, in accordance with some embodiments.

FIG. 11 illustrates an example of an operational flow/algorithmic structure 1100 for a device to configure DMRS transmission using more than four DMRS locations, in accordance with some embodiments. A transmitter device can implement the operational flow/algorithmic structure 1100, such as the UE 104 or 106, the transmitter device 310, or the UE 1700 or components thereof, for example, processors 1704.

The operation flow/algorithmic structure 1100 may include, at 1102, generating, for a receiver device, a configuration of DMRSs for a PSSCH, the configuration indicating a plurality of DMRS positions in a slot, the plurality of DMRS positions including more than four positions. In an example, each DMRS position corresponds to a symbol location in the slot and is indicated with an index of this symbol location. The number of the DMRS positions (or, also referred to as DMRS locations) is at least five and up to the total number of symbol locations in the slot. The DMRS positions can correspond to a CDM group, where this group may, but need not, be associated with more than two antenna ports. The transmitter device can also configure more than one CDM group for the receiver device and, if so, can indicate whether resource elements corresponding to an additional CDM group is to be used for DMRS transmission or to remain empty. In addition, the transmitter device can configure resource elements for the transmission of data in the PSSCH. Depending on the number of CDM symbols and the overlapping location, in the time domain, with data symbols, PSD power boosting may be used. The configuration can include an indication of the PSD power boosting and/or a power boosting scaling factor. In an example, multiple configurations are generated for the receiver device, each of which corresponds to a different resource pool for DMRS transmission in the PSSCH.

The operation flow/algorithmic structure 1100 may include, at 1104, sending, to the receiver device, the configuration. For instance, the configuration can be signaled via RRC messages. Further, specific parameters of the configuration or changes thereto can be signaled via additional RRC messages and/or SCI. In an example, when multiple resource pools are configured, RRC or SCI signaling can be used to indicate a resource pool selection (or, equivalently, a configuration selection) to the receiver UE. This selection can be based on feedback information from the receiver device.

The operation flow/algorithmic structure 1100 may include, at 1106, sending, to the receiver device, the DMRSs based on the configuration. For instance, the DMRSs to be sent are mapped to the physical resources of the PSSCH according to the configuration, and these physical resources carry the information that the DMRSs include.

FIG. 12 illustrates an example of an operational flow/algorithmic structure 1200 for a device to receive DMRS using more than four DMRS locations, in accordance with some embodiments. A receiver device can implement the operational flow/algorithmic structure 1200, such as the UE 104 or 106, the receiver device 320, or the UE 1700 or components thereof, for example, processors 1704.

The operation flow/algorithmic structure 1200 may include, at 1202, determining a configuration of DMRSs for a PSSCH, the configuration indicating a plurality of DMRS positions in a slot, the plurality of DMRS positions including more than four positions. In an example, each DMRS position corresponds to a symbol location in the slot and is indicated with an index of this symbol location. The number of the DMRS positions (or, also referred to as DMRS locations) is at least five and up to the total number of symbol locations in the slot. The DMRS positions can correspond to a CDM group, where this group may, but need not, be associated with more than two antenna ports. The transmitter device can also configure more than one CDM group for the receiver device and, if so, can indicate whether resource elements corresponding to an additional CDM group is to be used for DMRS transmission or to remain empty. In addition, the transmitter device can configure resource elements for the transmission of data in the PSSCH. Depending on the number of CDM symbols and the overlapping location, in the time domain, with data symbols, PSD power boosting may be used. The configuration can include an indication of the PSD power boosting and/or a power boosting scaling factor. In an example, multiple configurations are generated for the receiver device, each of which corresponds to a different resource pool for DMRS transmission in the PSSCH. The configuration can be determined based on signaling from the transmitter device. The signaling can use RRC messages. Further, specific parameters of the configuration or changes thereto can be signaled via additional RRC messages and/or SCI. In an example, when multiple resource pools are configured, RRC or SCI signaling can be used to indicate a resource pool selection (or, equivalently, a configuration selection) to the receiver UE. Alternatively, rather than using signaling from the transmitter device to indicate a configuration selection, the receiver device can automatically select one of the possible configurations based on feedback information or can fallback to using a default configuration based on one or more triggers.

The operation flow/algorithmic structure 1200 may include, at 1204, receiving the DMRSs on the PSSCH based on the configuration, the DMRSs received at the plurality of DMRS positions. In an example, the receiver device is configured to monitor and detect the DMRSs according to the configuration.

The operation flow/algorithmic structure 1200 may include, at 1206, performing, based on the DMRSs, a channel estimation for demodulation of the PSSCH. For instance, the receiver device determines the REs that carry DMRSs to then detect the DMRSs and performs the relevant measurements (e.g., RSRP measurements that are then averaged) of the channel estimation. If PSD power boosting is configured, these measurements account for the scaling factor. Further, the UE can perform PSSCH rate matching when decoding the PSSCH data.

FIG. 13 illustrates an example of a slot aggregation 1300 for DMRS, in accordance with some embodiments. The use of the slot aggregation 1300 can be implemented in conjunction with or independent of the use of a CDM group associated with more than two antenna ports and/or the use of denser DRMS locations, as previously described herein above. In an example, the slot aggregation 1300 is a PSSCH slot aggregation (repetition). Generally, when PSSCH slot aggregation is configured, DMRS time domain bundling can be configured to improve the receiver device channel estimation quality. In particular, when the PSSCH slot aggregation configuration indicates that the DMRS transmission scheme is not changing (or substantially changing to have a meaningful impact on the channel quality estimation) from one slot to another slot (e.g., an adjacent slot). In this case, DMRS time domain bundling can represent the use of the DMRSs across aggregated slots to perform the channel estimation (instead of performing this channel estimation per each slot by using only the DMRSs received in the slot).

In an example, a number of slots ($N_{slotaggregated}$) is aggregated and this number is indicated in a configuration of the receiver device (e.g., via RRC signaling). In this example, a DMRS time domain bundle size is defined in terms of a number of slots (e.g., the DMRS time domain bundle size is a number $N_{slotforbundledDMRS}$). Generally, $N_{slotforbundledDMRS}$ is smaller than or equal to $N_{slotaggregated}$. For instance, $N_{slotaggregated}$ is four, whereas $N_{slotforbundledDMRS}$ is two. In this illustrations, two DMRS bundles are defined. In particular, for four slots indexed "k" through "k+3," the first DMRS bundle corresponds to slots "k" and "k+1" and the second DMRS bundle corresponds to slots "k+2" and "k+3." Of course, these numbers are provided for illustrative purposes and other number are possible (e.g., $N_{slotaggregated}$ is two-hundred fifty six, and a bundle size of sixty four (resulting in four DMRS bundles), of one-hundred twenty-eight (resulting two DMRS bundles), or of two-hundred fifty-six (resulting in one DMRS bundle) are possible).

In an example, the slot aggregation 1300 (e.g., $N_{slotaggregated}$) is indicated to the receiver device via RRC and/or SCI signaling. The bundling size to use (e.g., $N_{slotforbundledDMRS}$) can be indicated in the same signaling or another signaling.

In the illustration of FIG. 13, the slot aggregation 1300 is configured for "k+2" slots (these slots are indexed with index "k" starting at zero). Each slot includes a number of DMRS symbols (indicated with the rectangles marked with the diagonal lines and labeled with the "DMRS" label) and a number of data symbols (indicated with the rectangles that are blank and labeled with the "data" label). The first slot (e.g., slot "0") also includes an automatic gain control (AGC) symbol (indicated with the rectangles marked with the vertical and horizontal lines and labeled with the "AGC" label). A bundle size "i" is also configured (for simplicity, "i" is shown equal to two in FIG. 13, although a different value is possible). Hence, in slots "0" and "1," the DRMS symbols received in these slots are used for a first channel estimation. In slots "k" and "k+1," the DRMS symbols received in these slots are used for a second channel estimation independently of the first channel estimation.

The above DMRS bundling across multiple aggregated slots is possible because the receiver device can assume that the DMRSs in the same time domain bundler are quasi co-located (QCL'ed). In other words, the assumption here is that these DMRSs share the same channel statistics of delay spread, Doppler spread, Doppler shift, average gain, average delay and/or spatial reception parameters. Thus, the receiver device can average and/or filter the channel within the same bundle based on such channel statistics. Across different time domain bundles, the receiver device cannot assume that the DMRSs are QCL'ed. Accordingly, the averaging and filtering are not possible.

In an example, a transmitter device and/or a receiver device may not be capable of performing phase continuity when a duplexing direction change occurs for the PSSCH at either device. In particular, in one duplexing direction, a first device can be operating as a transmitter device and a second device can be operating as a receiver device. This set-up can last for a first time period (e.g., a first number of slots ($N_1$)). At some point, a duplexing direction occurs such that the second device can transmit to the first device. In this case, the second device can operate as a transmitter device and the first device as a receiver device. This set-up can last for a second time period (e.g., a second number of slots ($N_2$)). Subsequently, another duplexing direction occurs, such that the first device and the second device again operate as a transmitter device and a receiver device, respectively. This set-up can last for a third time period (e.g., a third number of slots ($N_3$)).

When the first duplexing direction changes, the first device may not be capable of maintaining the phase (e.g., its phase lock mechanism does not allow an estimated phase to be locked to the phase before the duplexing change). Similarly, when the second duplexing direction changes, the first device may also not be capable of maintaining the phase (e.g., its phase lock mechanism does not allow an estimated phase to be locked to the phase before the duplexing change). Additionally or alternatively, the second device may suffer from the same lack of phase lock mechanism capability.

In an example, when there is a lack of phase lock mechanism capability, a time bundle size can be divided into smaller sizes, referred to a division of a nominal time domain bundle into multiple actual dime domain bundles. This division occurs if a transmitter device is incapable of phase continuity (regardless of the phase locking mechanism capability of a receiver device), or if the receiver device is incapable of phase continuity (even if the transmitter device is capable of phase continuity). The division does not occur when the both the transmitter device and the receiver device are capable of phase continuity.

Accordingly, capability information can be exchanged between the two devices, whereby each device indicates it phase lock mechanism capability to the other device. If both devices are capable of phase continuity, the slot aggregation 1300 and the bundle size can be used as configured via the RRC signaling and/or SCI signaling. Otherwise, the division occurs and the receiver device can use the smaller bundle segments. To illustrate, and referring to the three time periods described herein above, assume that the three time periods correspond to two-hundred fifty six slots. The first time period $N_1$ happens to be one-hundred twenty-eight slots, whereas the second time period $N_2$ and the third time period $N_3$ happen to be eighty slots and forty-eight slots, respectively. Also assume a slot aggregation of two-hundred fifty six slots and an equal bundle size of two-hundred fifty six slots. In this illustration, three bundle segments are used. The first one corresponds to the first time period $N_1$ and one-hundred twenty-eight slots long. The second bundle segment and the third bundle segment correspond to the second time period $N_2$ and the third time period $N_3$ and are eighty slots long and forty-eight slots long, respectively. Accordingly, rather than performing a channel estimation by using DMRSs received in different locations within two-hundred fifty six slots, three different channel estimations are performed. The first channel estimation is performed using the DMRSs received prior to the first duplexing direction change (e.g., different locations within the first one-hundred twenty-eight slots). The second channel estimation is performed using the DMRSs received between the first duplexing direction change and the second duplexing direction change (e.g., different locations within the next eighty slots). The third channel estimation is performed using the DMRSs received after the second duplexing direction change (e.g., different locations within the last forty-eight slots).

FIG. 14 illustrates an example of an operational flow/algorithmic structure 1400 for a device to configure DMRS transmission using slot aggregation, in accordance with some embodiments. A transmitter device can implement the operational flow/algorithmic structure 1400, such as the UE 104 or 106, the transmitter device 310, or the UE 1700 or components thereof, for example, processors 1704.

The operation flow/algorithmic structure 1400 may include, at 1402, generating, for a receiver device, a configuration of DMRSs for a PSSCH, the configuration indicating that a first DMRS received in a first slot can be bundled with a second DMRS received in a second slot for a channel estimation for demodulation of the PSSCH. In an example, slot aggregation is used and the number of slots to be aggregated is defined in the configuration. Because slot aggregation is used, bundling the DMRSs is allowed. The bundle size can be defined as a function of the number of slots, where this number is smaller than the number of slots configured for the slot aggregation. The bundle size can also be defined in the configuration.

The operation flow/algorithmic structure 1400 may include, at 1404, sending, to the receiver device, the configuration. For instance, the configuration can be signaled via RRC messages. Further, specific parameters of the configuration or changes thereto can be signaled via additional RRC messages and/or SCI. In an example, when multiple resource pools are configured, RRC or SCI signaling can be used to indicate a resource pool selection (or, equivalently, a configuration selection) to the receiver UE. This selection can be based on feedback information from the receiver device.

The operation flow/algorithmic structure 1400 may include, at 1406, sending, to the receiver device, the DMRSs based on the configuration. For instance, the DMRSs to be sent are mapped to the physical resources of the PSSCH according to the configuration, and these physical resources carry the information that the DMRSs include.

FIG. 15 illustrates an example of an operational flow/algorithmic structure 1500 for a device to receive DMRS using slot aggregation, in accordance with some embodiments. A receiver device can implement the operational flow/algorithmic structure 1500, such as the UE 104 or 106, the receiver device 320, or the UE 1700 or components thereof, for example, processors 1704.

The operation flow/algorithmic structure 1500 may include, at 1502, determining a configuration of DMRSs for a PSSCH, the configuration indicating that a first DMRS received in a first slot can be bundled with a second DMRS received in a second slot for a channel estimation for demodulation of the PSSCH. In an example, slot aggregation is used and the number of slots to be aggregated is defined in the configuration. Because slot aggregation is used, bundling the DMRSs is allowed. The bundle size can be defined as a function of the number of slots, where this number is smaller than the number of slots configured for the slot aggregation. The bundle size can also be defined in the configuration. Further, capability information may have been exchanged between the transmitter device and the receiver device and this information can indicate whether each of these two devices is capable of phase continuity. If so, the receiver device determines that the bundle size is to be used for the channel estimation. Otherwise, the receiver device can determine that a division of the bundle size into smaller bundle segments is needed. The signaling of the configuration can use RRC messages and/or SCI messages. The signaling of the capability information can use RRC messages.

The operation flow/algorithmic structure 1500 may include, at 1504, receiving the DMRSs on the PSSCH based on the configuration, the first DMRS received in the first slot and the second DMRS received in the second slot. In an example, the receiver device is configured to monitor and detect the DMRSs according to the configuration.

The operation flow/algorithmic structure 1500 may include, at 1506, determining a DMRS measurement based on a first measurement on the first DMRS and a second measurement on the second DMRS. For example, each of the first measurement and the second measurement is an RSRP measurement. If the two DMRS belongs to the same bundle or bundle segment, the two corresponding two measurements can become part of the DMRS measurement. For instance, the DMRS measurement is a statistical measure of such measurements (and, similarly, other RSRP measurements for DMRSs that need to be bundled).

The operation flow/algorithmic structure 1500 may include, at 1508, performing, based on the DMRS measurement, the channel estimation. For instance, a channel quality is estimated from the DMRS measurement for demodulating the data received in the aggregated slots (or, in a slot segment corresponding to the bundle segment to which the DMRS measurement applies).

FIG. 16 illustrates receive components 1600 of the UE 104 or 106 in accordance with some embodiments. The receive components 1600 may include an antenna panel 1604 that includes a number of antenna elements. The panel 1604 is shown with four antenna elements, but other embodiments may include other numbers.

The antenna panel 1604 may be coupled to analog beamforming (BF) components that include a number of phase shifters 1608(1)-1608(4). The phase shifters 1608(1)-1608(4) may be coupled with a radio-frequency (RF) chain 1612. The RF chain 1612 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values, to the phase shifters 1608(1)-1608(4) to provide a receive beam at the antenna panel 1604. These BF weights may be determined based on the channel-based beamforming.

Figure 17:
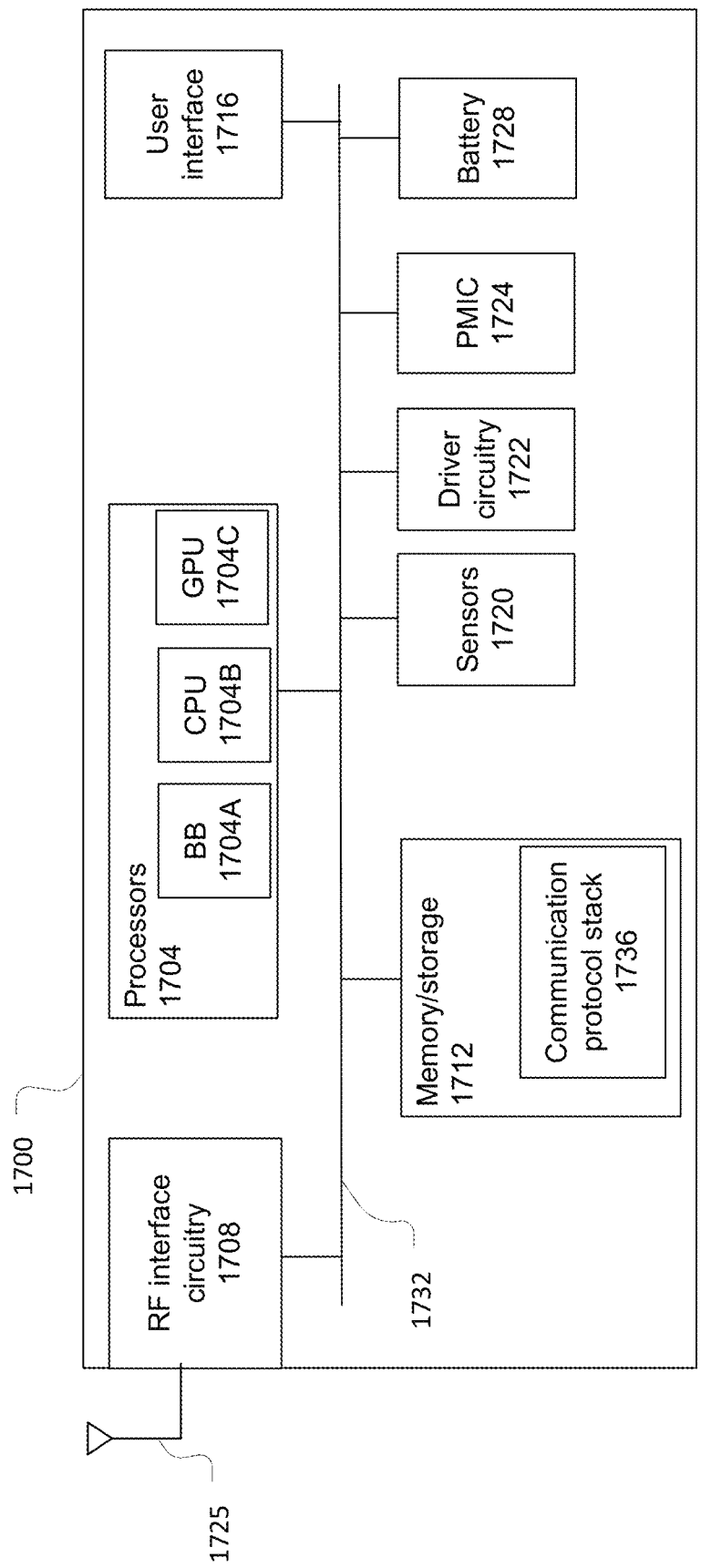
FIG. 17 illustrates an example of a UE, in accordance with some embodiments.

FIG. 17 illustrates a UE 1700 in accordance with some embodiments. The UE 1700 may be similar to and substantially interchangeable with UE 104 or 106 of FIG. 1.

Similar to that described above with respect to UE 104 or 106, the UE 1700 may be any mobile or non-mobile computing device, such as mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1700 may include processors 1704, RF interface circuitry 1708, memory/storage 1712, user interface 1716, sensors 1720, driver circuitry 1722, power management integrated circuit (PMIC) 1724, and battery 1728. The components of the UE 1700 may be implemented as integrated circuits (ICs), portions thereof, discrete electronic devices, or other modules, logic, hardware, software, firmware, or a combination thereof. The block diagram of FIG. 17 is intended to show a high-level view of some of the components of the UE 1700. However, some of the components shown may be omitted, additional components may be present, and different arrangements of the components shown may occur in other implementations.

The components of the UE 1700 may be coupled with various other components over one or more interconnects 1732, which may represent any type of interface, input/output, bus (local, system, or expansion), transmission line, trace, optical connection, etc. that allows various circuit components (on common or different chips or chipsets) to interact with one another.

The processors 1704 may include processor circuitry, such as baseband processor circuitry (BB) 1704A, central processor unit circuitry (CPU) 1704B, and graphics processor unit circuitry (GPU) 1704C. The processors 1704 may include any type of circuitry or processor circuitry that executes or otherwise operates computer-executable instructions, such as program code, software modules, or functional processes from memory/storage 1712 to cause the UE 1700 to perform operations as described herein.

In some embodiments, the baseband processor circuitry 1704A may access a communication protocol stack 1736 in the memory/storage 1712 to communicate over a 3GPP compatible network. In general, the baseband processor circuitry 1704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1708.

The baseband processor circuitry 1704A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1704A may also access group information from memory/storage 1712 to determine search space groups in which a number of repetitions of a PDCCH may be transmitted.

The memory/storage 1712 may include any type of volatile or non-volatile memory that may be distributed throughout the UE 1700. In some embodiments, some of the memory/storage 1712 may be located on the processors 1704 themselves (for example, L1 and L2 cache), while other memory/storage 1712 is external to the processors 1704 but accessible thereto via a memory interface. The memory/storage 1712 may include any suitable volatile or non-volatile memory, such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1708 may include transceiver circuitry and a radio frequency front module (RFEM) that allows the UE 1700 to communicate with other devices over a radio access network. The RF interface circuitry 1708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1725 and proceed to filter and amplify (with a low-noise amplifier) the signal. The signal may be provided to a receiver of the transceiver that down-converts the RF signal into a baseband signal that is provided to the baseband processor of the processors 1704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1725.

In various embodiments, the RF interface circuitry 1708 may be configured to transmit/receive signals in a manner compatible with NR access technologies.

The antenna 1725 may include a number of antenna elements that each convert electrical signals into radio waves to travel through the air and to convert received radio waves into electrical signals. The antenna elements may be arranged into one or more antenna panels. The antenna 1725 may have antenna panels that are omnidirectional, directional, or a combination thereof to enable beamforming and multiple input, multiple output communications. The antenna 1725 may include microstrip antennas, printed antennas fabricated on the surface of one or more printed circuit boards, patch antennas, phased array antennas, etc. The antenna 1725 may have one or more panels designed for specific frequency bands including bands in FR1 or FR2.

The user interface circuitry 1716 includes various input/output (I/O) devices designed to enable user interaction with the UE 1700. The user interface 1716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators, such as light emitting diodes (LEDs) and multi-character visual outputs, or more complex outputs, such as display devices or touchscreens (for example, liquid crystal displays (LCDs), LED displays, quantum dot displays, projectors, etc.), with the output of characters, graphics, multimedia objects, and the like being generated or produced from the operation of the UE 1700.

The sensors 1720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1722 may include software and hardware elements that operate to control particular devices that are embedded in the UE 1700, attached to the UE 1700, or otherwise communicatively coupled with the UE 1700. The driver circuitry 1722 may include individual drivers allowing other components to interact with or control various input/output (I/O) devices that may be present within, or connected to, the UE 1700. For example, driver circuitry 1722 may include a display driver to control and allow access to a display device, a touchscreen driver to control and allow access to a touchscreen interface, sensor drivers to obtain sensor readings of sensor circuitry 1720 and control and allow access to sensor circuitry 1720, drivers to obtain actuator positions of electro-mechanic components or control and allow access to the electro-mechanic components, a camera driver to control and allow access to an embedded image capture device, audio drivers to control and allow access to one or more audio devices.

The PMIC 1724 may manage power provided to various components of the UE 1700. In particular, with respect to the processors 1704, the PMIC 1724 may control power-source selection, voltage scaling, battery charging, or DC-to-DC conversion.

In some embodiments, the PMIC 1724 may control, or otherwise be part of, various power saving mechanisms of the UE 1700. For example, if the platform UE is in an RRC Connected state, where it is still connected to the RAN node as it expects to receive traffic shortly, then it may enter a state known as Discontinuous Reception Mode (DRX) after a period of inactivity. During this state, the UE 1700 may power down for brief intervals of time and thus save power. If there is no data traffic activity for an extended period of time, then the UE 1700 may transition off to an RRC Idle state, where it disconnects from the network and does not perform operations, such as channel quality feedback, handover, etc. The UE 1700 goes into a very low power state and it performs paging where again it periodically wakes up to listen to the network and then powers down again. The UE 1700 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1728 may power the UE 1700, although in some examples the UE 1700 may be mounted deployed in a fixed location, and may have a power supply coupled to an electrical grid. The battery 1728 may be a lithium ion battery, a metal-air battery, such as a zinc-air battery, an aluminum-air battery, a lithium-air battery, and the like. In some implementations, such as in vehicle-based applications, the battery 1728 may be a typical lead-acid automotive battery.

Figure 18:
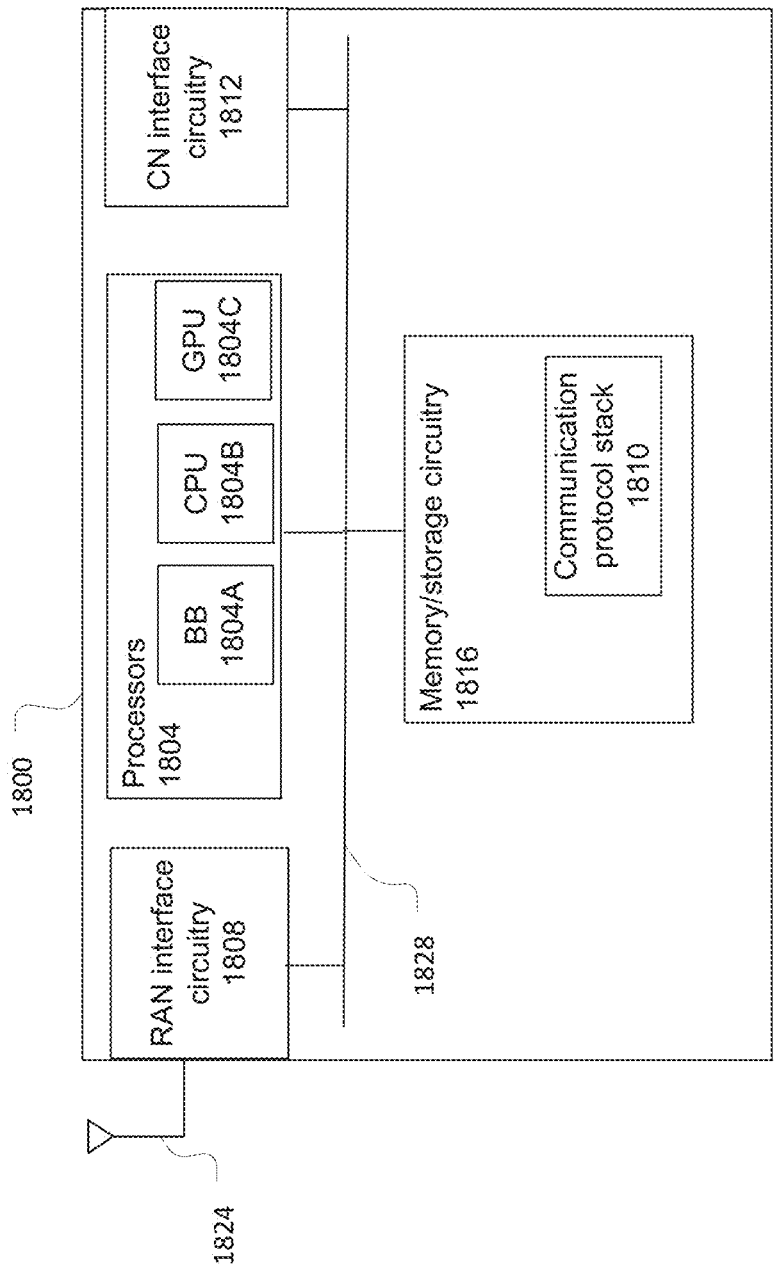
FIG. 18 illustrates an example of a base station, in accordance with some embodiments.

FIG. 18 illustrates a gNB 1800 in accordance with some embodiments. The gNB node 1800 may be similar to and substantially interchangeable with gNB 188. A base station, such as the base station 182, can have the same or similar components as the gNB 1800.

The gNB 1800 may include processors 1804, RF interface circuitry 1808, core network (CN) interface circuitry 1812, and memory/storage circuitry 1816.

The components of the gNB 1800 may be coupled with various other components over one or more interconnects 1828.

The processors 1804, RF interface circuitry 1808, memory/storage circuitry 1816 (including communication protocol stack 1810), antenna 1824, and interconnects 1828 may be similar to like-named elements shown and described with respect to FIG. 16.

The CN interface circuitry 1812 may provide connectivity to a core network, for example, a $5^{th}$ Generation Core network (5GC) using a 5GC-compatible network interface protocol, such as carrier Ethernet protocols, or some other suitable protocol. Network connectivity may be provided to/from the gNB 1800 via a fiber optic or wireless backhaul. The CN interface circuitry 1812 may include one or more dedicated processors or FPGAs to communicate using one or more of the aforementioned protocols. In some implementations, the CN interface circuitry 1812 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures, may be configured to operate in accordance with one or more of the examples set forth below in the example section.

EXAMPLES

In the following sections, further exemplary embodiments are provided.

Example 1 includes a method. The method is implemented on a device. The method comprises: determining a configuration of demodulation reference signals (DMRSs) for a physical sidelink shared channel (PSSCH), the configuration indicating a code division multiplexing (CDM) group associated with a plurality of antenna ports, the plurality of antenna ports including more than two antenna ports; receiving, by using the plurality of antenna ports, the DMRSs on the PSSCH based on the configuration, the DMRSs received in resource elements (REs) corresponding to the CDM group; and performing, based on the DMRSs, a channel estimation for demodulation of the PSSCH.

Example 2 includes a method of example 1, wherein the CDM group is a first CDM group and the plurality of antenna ports are a first plurality of antenna ports, wherein the configuration indicates a second CDM group associated with a second plurality of ports, and wherein the first CDM group is orthogonal to the second CDM group.

Example 3 includes a method of any preceding examples 1-2, wherein the plurality of antenna ports include four antenna ports, and wherein the CDM group includes four REs that respectively correspond to the four antenna ports.

Example 4 includes a method of any preceding examples 1-3, wherein the CDM group is a first CDM group, wherein the configuration indicates a second CDM group and whether the second CDM group is used for DMRS transmission.

Example 5 includes a method of example 4, wherein PSSCH rate matching is performed based on the first CDM group and the second CDM group independent of whether the second CDM group is used for DMRS transmission to the device.

Example 6 includes a method of any preceding examples 1-5, wherein the CDM group is a first CDM group for first DMRS transmission to the device, wherein the configuration indicates a second CDM group and whether the second CDM group is used for second DMRS transmission, wherein a power spectrum density (PSD) of the first DMRS transmission is boosted by a first factor.

Example 7 includes of example 6, wherein the first factor is equal to a total number of CDM groups indicated in the configuration divided by a total number of CDM groups used for DMRS transmission to the device.

Example 8 includes a method of any preceding examples 1-7, wherein the CDM group is a first CDM group for first DMRS transmission to the device, wherein the configuration indicates a second CDM group and that the second CDM group is not used for second DMRS transmission to the device, wherein a power spectrum density (PSD) of the first DMRS transmission is boosted by a first factor having a value of at least two.

Example 9 includes a method of any preceding examples 1-8, wherein the configuration indicates a single symbol DMRS.

Example 10 includes a method of any preceding examples 1-8, wherein the configuration indicates a multi-symbol DMRS and is received in first signaling, and wherein the method further comprises receiving second signaling that indicates DMRS transmission associated with the CDM group and using a single symbol DMRS.

Example 11 includes a method of any preceding examples 1-10, wherein the device is a first device, and wherein the method further comprises sending, to a second device, information indicating a sidelink quality or a recommended DMRS configuration based on the sidelink quality, wherein the configuration is received from the second device based on the information.

Example 12 includes a method of example 11, wherein the recommended DMRS configuration includes at least one of: a number of DMRS symbols per location, a number of DMRS locations within a slot, or whether boosting a power spectrum density (PSD) for DMRS transmission is needed.

Example 13 includes a method of any preceding examples 1-12, wherein the configuration further indicates a plurality of DMRS positions in a slot, the plurality of DMRS positions including more than four positions, and wherein receiving the DMRSs received at the plurality of DMRS positions.

Example 14 includes a method of any preceding examples 1-13, wherein the configuration further indicates that a first DMRS received in a first slot can be bundled with a second DMRS received in a second slot for the channel estimation.

Example 15 includes a method. The method is implemented on a device. The method comprises: determining a configuration of demodulation reference signals (DMRSs) for a physical sidelink shared channel (PSSCH), the configuration indicating a plurality of DMRS positions in a slot, the plurality of DMRS positions including more than four positions; receiving the DMRSs on the PSSCH based on the configuration, the DMRSs received at the plurality of DMRS positions; and performing, based on the DMRSs, a channel estimation for demodulation of the PSSCH.

Example 16 includes a method of example 15, wherein the configuration further indicates whether a power spectrum density (PSD) of the DMRS transmission is boosted.

Example 17 includes a method of example 16, wherein the PSD is indicated as being boosted for a transmission on a first subcarrier of a first DMRS symbol at a first position in the time domain based on the configuration indicating that no data symbol transmission on a second subcarrier is at the first position.

Example 18 includes a method of example 16, wherein the PSD is indicated as not being boosted for a transmission on a first subcarrier of a first DMRS symbol at a first position in the time domain based on the configuration indicating that a transmission on a second subcarrier of a data symbol is at the first position.

Example 19 includes a method of any preceding examples 15-18, wherein the configuration is for a resource pool from a plurality of resource pools, wherein the plurality of resource pools have different corresponding configurations.

Example 20 includes a method of example 19, wherein the configuration is of the resource pool and differs from another configuration of another resource pool in at least one of: time domain pattern density, number of DMRS symbols per time domain position, whether DMRS power boosting density is allowed, a DMRS type based on a number of code division multiplexing (CDM) groups or orthogonal cover code (OCC) pattern.

Example 21 includes a method of example 19, wherein the plurality of resource pools are configured for different corresponding coverages.

Example 22 includes a method of example 21, wherein the different coverage is based on a pathloss or a reference signal receive power (RSRP) measurement between devices.

Example 23 includes a method of example 19, wherein the resource pool is a fallback resource pool that the device monitors based on a time period, loss of communication, failure to receive DMRS, failure to perform the channel estimation, a pathloss, or a reference signal receive power (RSRP) measurement.

Example 24 includes a method of any preceding examples 15-23, wherein the configuration further indicates a code division multiplexing (CDM) group associated with a plurality of antenna ports, wherein the plurality of antenna ports include more than two antenna ports, wherein the DMRSs are received by using the plurality of antenna ports and in resource elements (REs) corresponding to the CDM group.

Example 25 includes a method of any preceding examples 15-24, wherein the configuration further indicates that a first DMRS received in a first slot can be bundled with a second DMRS received in a second slot for the channel estimation.

Example 26 includes a method. The method is implemented on a device. The method comprises: determining a configuration of demodulation reference signals (DMRSs) for a physical sidelink shared channel (PSSCH), the configuration indicating that a first DMRS received in a first slot can be bundled with a second DMRS received in a second slot for a channel estimation for demodulation of the PSSCH; receiving the DMRSs on the PSSCH based on the configuration, the first DMRS received in the first slot and the second DMRS received in the second slot; determining a DMRS measurement based on a first measurement on the first DMRS and a second measurement on the second DMRS; and performing, based on the DMRS measurement, the channel estimation.

Example 27 includes a method of example 26, wherein the configuration includes a DMRS time domain bundle size indicating a number of slots that can be bundled for the channel estimation. Example 28 includes a method of any preceding examples 26-27, wherein the device is a first device, wherein the configuration is received from a second device, and wherein the operations further comprise: sending, to the second device, capability information indicating whether the first device can maintain phase continuity upon a duplex direction change, wherein the configuration is based on the capability information.

Example 29 includes a method of any preceding examples 26-28, wherein the device is a first device, wherein the configuration is received from a second device, and wherein the configuration is received based on capability of the second device to maintain phase continuity upon a duplex direction change.

Example 30 includes a method of any preceding examples 26-29, wherein the configuration includes a first DMRS time domain bundle size indicating a total number of slots that can be bundled for the channel estimation, wherein the device is incapable of maintaining phase continuity upon a duplex direction change, and wherein the operations further comprise: determining a second DMRS time domain bundle size that is smaller than the first DMRS time domain bundle size, wherein a difference between slot numbers of the first slot and the second slot is within the second DMRS time domain bundle size.

Example 31 includes a method of any preceding examples 26-30, wherein the configuration further indicates a code division multiplexing (CDM) group associated with a plurality of antenna ports, wherein the plurality of antenna ports include more than two antenna ports, wherein the DMRSs are received by using the plurality of antenna ports and in resource elements (REs) corresponding to the CDM group.

Example 32 includes a method of any preceding examples 26-31, wherein the configuration further indicates a plurality of DMRS positions in a slot, the plurality of DMRS positions including more than four positions, and wherein receiving the DMRSs received at the plurality of DMRS positions.

Example 33 includes a device comprising means to perform one or more elements of a method described in or related to any of the examples 1-32.

Example 34 includes one or more computer-readable media storing instructions that, upon execution by a device, cause the device to perform operations of a method described in or related to any of the examples 1-32.

Example 35 includes a device comprising logic, modules, or circuitry to perform one or more elements of a method described in or related to any of the examples 1-32.

Example 36 includes a device comprising: one or more processors and one or more computer-readable media comprising instructions that, upon execution by the one or more processors, configure the device to perform any of the examples 1-32.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable storage media storing instructions, that upon execution, cause operations comprising:
   sending, to a network node, capability information indicating whether maintaining phase continuity upon a duplex direction change is supported;
   determining a configuration of demodulation reference signals (DMRSs) for a physical channel, the configuration indicating that a first DMRS received in a first slot can be bundled with a second DMRS received in a second slot for a channel estimation for demodulation of the physical channel, the configuration being based on the capability information;
   processing the DMRSs based on the configuration, the first DMRS received in the first slot and the second DMRS received in the second slot;
   determining a DMRS measurement based on a first measurement on the first DMRS and a second measurement on the second DMRS; and
   performing, based on the DMRS measurement, the channel estimation.

2. The one or more non-transitory computer-readable storage media of claim 1, wherein the configuration includes a DMRS time domain bundle size.

3. The one or more non-transitory computer-readable storage media of claim 1, wherein the configuration is received based on a capability of the network node to maintain phase continuity upon the duplex direction change.

4. The one or more non-transitory computer-readable storage media of claim 1, wherein the configuration includes a first DMRS time domain bundle size indicating a total number of slots that can be bundled for the channel estimation.

5. The one or more non-transitory computer-readable storage media of claim 4, wherein the operations are performed on a device that is incapable of maintaining phase continuity upon a duplex direction change.

6. The one or more non-transitory computer-readable storage media of claim 5, wherein the operations further comprise: determining a second DMRS time domain bundle size that is smaller than the first DMRS time domain bundle size, wherein a difference between slot numbers of the first slot and the second slot is within the second DMRS time domain bundle size.

7. The one or more non-transitory computer-readable storage media of claim 1, wherein the operations further comprise: sending, to a device, information indicating a sidelink quality or a recommended DMRS configuration based on the sidelink quality.

8. The one or more non-transitory computer-readable storage media of claim 7, wherein the configuration is received from the device based on the information, wherein the recommended DMRS configuration includes at least one of: a number of DMRS symbols per location, a number of DMRS locations within a slot, or whether boosting a power spectrum density (PSD) for DMRS transmission is needed.

9. The one or more non-transitory computer-readable storage media of claim 1, wherein the configuration further indicates a plurality of DMRS positions in the second slot, the plurality of DMRS positions including more than four positions.

10. The one or more non-transitory computer-readable storage media of claim 1, wherein the configuration further indicates whether a power spectrum density (PSD) of a DMRS transmission is boosted.

11. The one or more non-transitory computer-readable storage media of claim 1, wherein the configuration corresponds to a resource pool from a plurality of resource pools, wherein the plurality of resource pools have different corresponding configurations and are for different coverages.

12. A method comprising:
sending, to a network node, capability information indicating whether maintaining phase continuity upon a duplex direction change is supported;
determining a configuration of demodulation reference signals (DMRSs) for a physical channel, the configuration indicating that a first DMRS received in a first slot can be bundled with a second DMRS received in a second slot for a channel estimation for demodulation of the physical channel, the configuration being based on the capability information;
processing the DMRSs based on the configuration, the first DMRS received in the first slot and the second DMRS received in the second slot;
determining a DMRS measurement based on a first measurement on the first DMRS and a second measurement on the second DMRS; and
performing, based on the DMRS measurement, the channel estimation.

13. The method of claim 12, wherein the configuration includes a DMRS time domain bundle size indicating a number of slots that can be bundled for the channel estimation.

14. The method of claim 12, wherein the configuration is received based on a capability of the network node to maintain phase continuity upon the duplex direction change.

15. The method of claim 12, wherein the configuration includes a first DMRS time domain bundle size indicating a total number of slots that can be bundled for the channel estimation.

16. The method of claim 15, wherein the method is implemented on a device that is incapable of maintaining phase continuity upon a duplex direction change.

17. The method of claim 16, wherein the method further comprises: determining a second DMRS time domain bundle size that is smaller than the first DMRS time domain bundle size, wherein a difference between slot numbers of the first slot and the second slot is within the second DMRS time domain bundle size.

18. An apparatus comprising:
processing circuitry configured to:
send, to a network node, capability information indicating whether maintaining phase continuity upon a duplex direction change is supported;
determine a configuration of demodulation reference signals (DMRSs) for a physical channel, the configuration indicating that a first DMRS received in a first slot can be bundled with a second DMRS received in a second slot for a channel estimation for demodulation of the physical channel, the configuration being based on the capability information;
process the DMRSs based on the configuration, the first DMRS received in the first slot and the second DMRS received in the second slot;
determine a DMRS measurement based on a first measurement on the first DMRS and a second measurement on the second DMRS; and
perform, based on the DMRS measurement, the channel estimation.

19. The apparatus of claim 18, wherein the processing circuitry is further configured to: send, to a device, information indicating a sidelink quality or a recommended DMRS configuration based on the sidelink quality.

20. The apparatus of claim 18, wherein the configuration further indicates a plurality of DMRS positions in the second slot, the plurality of DMRS positions including more than four positions.

* * * * *